(12) United States Patent
Subbarayan et al.

(10) Patent No.: US 10,049,396 B2
(45) Date of Patent: Aug. 14, 2018

(54) PRODUCT CONFIGURATION

(71) Applicant: Configit A/S, Copenhagen (DK)

(72) Inventors: Sathia Moorthy Subbarayan, Chennai (IN); Henrik Reif Andersen, Bagsvaerd (DK); Henrik Hulgaard, Copenhagen (DK)

(73) Assignee: Configit A/S, Copenhagen (DK)

( * ) Notice: Subject to any disclaimer, the term of this patent is extended or adjusted under 35 U.S.C. 154(b) by 993 days.

(21) Appl. No.: 14/069,167

(22) Filed: Oct. 31, 2013

(65) Prior Publication Data

US 2015/0120490 A1    Apr. 30, 2015

(51) Int. Cl.
*G06F 7/60* (2006.01)
*G06Q 30/06* (2012.01)

(52) U.S. Cl.
CPC ............... *G06Q 30/0621* (2013.01)

(58) Field of Classification Search
CPC .................................. G06C 30/0621
USPC ............................................. 703/2
See application file for complete search history.

(56) References Cited

U.S. PATENT DOCUMENTS

| | | | |
|---|---|---|---|
| 7,584,079 B2 | 9/2009 | Lichtenberg et al. | |
| 7,739,080 B1 * | 6/2010 | Beck ............ | G06F 17/50 700/95 |
| 8,812,341 B2 * | 8/2014 | Ehben ............ | G05B 17/02 705/7.27 |
| 9,141,708 B2 * | 9/2015 | Hungar ............ | G06Q 30/0625 |
| 9,880,694 B2 * | 1/2018 | Senesac ............ | G06F 3/0481 |
| 2012/0047045 A1 | 2/2012 | Gopikrishna et al. | |

FOREIGN PATENT DOCUMENTS

WO    WO 02/46980 A2    6/2002

OTHER PUBLICATIONS

Voronov et al., "Enumeration of valid partial configurations", 2011, Proceedings of Workshop on Configuration, IJCAI, vol. 755 , pp. 25-31.*

Subbarayan and Andersen, "Integrating a Variable Ordering Heuristic with BDDs and CSP Decomposition Techniques for Interactive Configurators", 2007, pp. 1-6.*

Subbarayan and Andersen, "Linear functions for interactive configuration using join matching and CSP tree decomposition", 2005, Proceedings of the Configuration Workshop held at IJCAI, pp. 7/75-12/75.*

(Continued)

*Primary Examiner* — Juan Ochoa
(74) *Attorney, Agent, or Firm* — Womble Bond Dickinson (US) LLP

(57) ABSTRACT

A valid configuration of a product is determined by a computer based on a complete product model. The initial product model includes variables with associated values, and rules, wherein the variables and rules define a configuration problem to be solved. Some variables of the initial product model are defined as scope variables. Based on the selected values for scope variables the initial product model is restricted by the computer to a simplified product model. The simplified product model is employed in order to set the values of the variables not being defined as scope variables in an iterative computer-implemented process.

17 Claims, 18 Drawing Sheets

(56) References Cited

OTHER PUBLICATIONS

Sathiamoorthy Subbarayan, "On Exploiting Structures for Constraint Solving", 2008, Diss. IT University of Copenhagen, 195 pages.*
Nielsen et al., "Requirements for logical models for value-added tax legislation", 2008, International Conference on Logic for Programming, Artificial Intelligence and Reasoning, pp. 1-5.*
Hvam et al., "Optimizing the order processing of customized products using product configuration", 2011, Production Engineering 5.6, pp. 1-8.*
Hadzic et al., "Fast backtrack-free product configuration using a precompiled solution space representation", 2004, small 10.1, pp. 1-8.*
Subbarayan et al., "Comparing two implementations of a complete and backtrack-free interactive configurator", 2004, Proceedings of the CP-04 Workshop on CSP Techniques with Immediate Application, pp. 97-111.*
European Patent Office Communication enclosing Extended European Search Report for counterpart European Patent Application No. 13005167.5, 8 pages, (dated Mar. 6, 2014).
Daniel Sabin, et al., "Product Configuration Frameworks—A Survey", IEEE Expert, IEEE Service Center, New York, NY, US, vol. 13, No. 4, XP000791757, pp. 42-49, (Jul. 1, 1998).
Giuseppe Attardi, et al., "Web-based Configuration Assistants", Artificial Intelligence for Engineering, Design, Analysis and Manufacturing, London, GB, vol. 12, No. 4, XP002902516, pp. 321-331, (Sep. 1, 1998).
Sathiamoorthy Subbarayan, "Integrating CSP Decomposition Techniques and BDDs for Compiling Configuration Problems," CP-AL-OR Conference, Prague, Springer LNCS 3524, p. 351-368 (2005).
Sathiamoorthy Subbarayan, et al., "Knowledge Compilation Properties of Tree-of-BDDs," AAAI Conference, Vancouver, p. 502-507 (2007).
Tarik Hadzic, et al., "Fast backtrack-free product configuration using a precompiled solution space representation," in Proceedings of the International Conference on Economic, Technical, and Organisational Aspects of Product Configuration Systems, Copenhagen, Denmark, 8 pages (Jun. 28-29, 2013).
European Patent Office, Summons to Attend Oral Proceedings Pursuant to Rule 115(1) EPC, dated Jun. 29, 2017, for corresponding European Patent Application No. 13005167.5, 16 pages, Munich, Germany.
Lai, Y.T. et al., "BDD Based Decomposition of the Logic Functions with Applications to FPGA Synthesis," Proceedings of the Design Automation Conference, Dallas, TX, Jun. 14-18, 1993, [Proceedings of the Design Automation Conference (DAC)], New York, NY, IEEE, US, vol. Conf. 30, Jun. 14, 1992, pp. 642-647.
Ravi, K. et al., "Approximation and Decomposition of Binary Decision Diagrams," Design Automation Conference, 1998. Proceedings San Francisco, CA, Jun. 15-19, 1998, Jan. 1, 1998, pp. 445-450.

* cited by examiner

Fig. 3

```
┌─────────────────────────────────────────────────────────┐
│ [§]              Edit Rule EmissionEuro          ?  x   │
│ ┌─Rule────────────────────────────────────────────────┐ │
│ │                                                     │ │
│ │  if( Country = "DK" or Country = "UK" )             │ │
│ │  then (                                             │ │
│ │                                                     │ │
│ │    if( Date < datetime("1992-07-01 00:00:00") ) then│ │
│ │    (                                                │ │
│ │       EmissionStandard = "None"                     │ │
│ │    )                                                │ │
│ │    else if ( Date < datetime("1996-01-01 00:00:00") ) then │
│ │    (                                                │ │
│ │       EmissionStandard = "Euro1"                    │ │
│ │    )                                                │ │
│ │    else if ( Date < datetime("2000-01-01 00:00:00") ) then │
│ │    (                                                │ │
│ │       EmissionStandard = "Euro2"                    │ │
│ │    )                                                │ │
│ │    else if ( Date < datetime("2005-01-01 00:00:00") ) then │
│ │    (                                                │ │
│ │       EmissionStandard = "Euro3"                    │ │
│ │    )                                                │ │
│ │    else if ( Date < datetime("2009-09-01 00:00:00") ) then │
│ │    (                                                │ │
│ │       EmissionStandard = "Euro4"                    │ │
│ │    )                                                │ │
│ │    else if ( Date < datetime("2014-09-01 00:00:00") ) then │
│ │    (                                                │ │
│ │       EmissionStandard = "Euro5"                    │ │
│ │    )                                                │ │
│ │    else (                                           │ │
│ │       EmissionStandard = "Euro6"                    │ │
│ │    )                                                │ │
│ │                                                     │ │
│ │  )                                                  │ │
│ │                                                     │ │
│ │ <[          ]                                    >  │ │
│ └─────────────────────────────────────────────────────┘ │
│                      [ Insert.. ][Check Rule][ OK ][Cancel]│
└─────────────────────────────────────────────────────────┘
```

Fig. 4

]inf;1992-06-30 23:59:59]
1992-07-01 00:00:00
[1992-07-01 00:00:01;1993-12-31 23:59:59]
1994-01-01 00:00:00
[1994-01-01 00:00:01;1995-12-31 23:59:59]
1996-01-01 00:00:00
[1996-01-01 00:00:01;1998-12-31 23:59:59]
1999-01-01 00:00:00
[1999-01-01 00:00:01;1999-12-31 23:59:59]
2000-01-01 00:00:00
[2000-01-01 00:00:01;2002-12-31 23:59:59]
2003-01-01 00:00:00
[2003-01-01 00:00:01;2004-12-31 23:59:59]
2005-01-01 00:00:00
[2005-01-01 00:00:01;2008-12-31 23:59:59]
2009-01-01 00:00:00
[2009-01-01 00:00:01;2009-08-31 23:59:59]
2009-09-01 00:00:00
[2009-09-01 00:00:01;2014-08-31 23:59:59]
2014-09-01 00:00:00
[2014-09-01 00:00:01;inf[

Fig. 6

Edit Relation: CurrencyFuel  —  ☐  X

Standard Editor

| | Country | Currency | Fuel |
|---|---|---|---|
| ▶ | "DK" | "DKK","EUR" | "Diesel" |
| | "UK" | "GBP" | "Diesel","Petrol" |
| | "US" | "USD" | "Diesel","Petrol" |
| * | | | |

[ OK ]   [ Cancel ]   [ Apply ]   [ Show Variables ]

Fig. 7

Edit Rule GearBox   ?  X

Rule ( if (Engine = "2.0 TDI")
then GearBox = "6 Shift" )

and ( if (Engine = "3.2 TDI")
then GearBox = "6 Shift" )

<  [        ]                    >

[ Insert.. ]  [ Check Rule ]  [ OK ]  [ Cancel ]

Fig. 8

| Variable | Domain Size | Number of Boolean Variables Required | Encoding Boolean Variables |
| --- | --- | --- | --- |
| Date | 21 | 5 | 0,1,2,3,4 |
| Country | 3 | 2 | 5,6 |
| Currency | 4 | 2 | 7,8 |
| EmissionStandard | 11 | 4 | 9,10,11,12 |
| Fuel | 2 | 1 | 13 |
| Engine | 3 | 2 | 14,15 |
| GearBox | 2 | 1 | 16 |

Fig. 11

Edit Rule US_Petrol

Rule if (Country = "US")
then fuel = "Petrol")

[Insert...] [Check Rule] [OK] [Cancel]

| Country | 5 | 6 | 13 | Fuel |
|---|---|---|---|---|
| DK | 0 | 0 | 0 | Diesel |
| UK | 0 | 1 | 1 | Petrol |
| US | 1 | 0 | | |

| Country | Fuel | Boolean | Value | Combinations | Allowed by Rule? |
|---|---|---|---|---|---|
| | | 5 | 6 | 13 | |
| DK | Diesel | 0 | 0 | 0 | Yes |
| UK | Diesel | 0 | 1 | 0 | Yes |
| US | Diesel | 1 | 0 | 0 | No |
| DK | Petrol | 0 | 0 | 1 | Yes |
| UK | Petrol | 0 | 1 | 1 | Yes |
| US | Petrol | 1 | 0 | 1 | Yes |

Edit Relation: ScopeRelation  —  □  x

Standard Editor

| | Country | Engine | GearBox |
|---|---|---|---|
| ▶ | "DK" | "2.0 TDI","3.2 TDI" | "6 Shift" |
| | "UK" | "2.0 TDI","3.2 TDI","2.0 TFSI" | "5 Shift","6 Shift" |
| | "US" | "2.0 TFSI" | "5 Shift","6 Shift" |
| * | | | |

OK    Cancel    Apply    Show Variables

```
[§]                Edit Rule EmissionUS       -   □   x
Rule
┌─────────────────────────────────────────────────────┐
│ /* ( Country = "US" ) */                            │
│                                                     │
│   if( Date < datetime("1994-01-01 00:00:00") ) then │
│   (                                                 │
│       EmissionStandard = "None"                     │
│   )                                                 │
│   else if ( Date < datetime("1999-01-01 00:00:00") ) then │
│   (                                                 │
│       EmissionStandard = "US-P1"                    │
│   )                                                 │
│   else if ( Date < datetime("2003-01-01 00:00:00") ) then │
│   (                                                 │
│       EmissionStandard = "US-TNLEV"                 │
│   )                                                 │
│   else if ( Date < datetime("2009-01-01 00:00:00") ) then │
│   (                                                 │
│       EmissionStandard = "US-P2"                    │
│   )                                                 │
│   else (                                            │
│       EmissionStandard = "US-P3A"                   │
│   )                                                 │
│                                                     │
│ <                                               >   │
└─────────────────────────────────────────────────────┘

[ Insert.. ] [ Check Rule ] [  OK  ] [ Cancel ]
```

Fig. 16

PRODUCT CONFIGURATION

FIELD OF THE INVENTION

The present invention generally relates to the task of solving complex product configuration problems. More specifically, it is directed to providing efficient answers to queries regarding the configuration of complex products.

BACKGROUND

The focus in manufacturing industry has shifted from mass production to mass customization. Companies continually have to offer more product variants with greater flexibility. Customizable products (e.g. cars) generally exhibit various variables (e.g. Country a car is to be sold in, Steering Wheel indicates whether the steering wheel is to be mounted on the left-hand or the right-hand side, Fuel Type of a car etc.), for each of which a user has to select a particular value out of a set of values (e.g. Diesel, Petrol for the variable Fuel Type) in order to configure the product. Usually, there are inter-dependencies among the variables and values of the product to configure. These inter-dependencies are captured by rules (e.g. if Country is Denmark (DK), then Steering Wheel is left, if Country is UK, Steering Wheel has to be set to right).

Product configuration is the task of finding a valid configuration for a configurable product, i.e. finding a combination among the values and variables of the product for which all rules between these variables and values are fulfilled.

Various approaches to implement product configuration methods by using computer technology have been taken in the prior art, such as U.S. Pat. No. 7,584,079 B2 which discloses a method of configuring a product composed of several inter-dependent parts. It employs "Virtual Tabulation", which is a method for keeping track of inter-dependencies among a large number of parts.

Integrating CSP Decomposition Techniques and BDDs for Compiling Configuration Problems; S. Subbaravan; CP-AI-OR Conference, Prague, 2005, Springer LNCS 3524, p. 351-368 [ToBBDs2005] discloses a decomposition scheme for compiling configuration problems based on Trees-of-Binary Decision Diagrams.

Knowledge Compilation Properties of Tree-of BDDs; S. Subbaravan, L. Bordeaux. Y. Hamadi; AAAI Conference, Vancouver, 2007 p. 502-507[ToBDDs2007] discloses a conjunction normal form to Tree-of-Binary Decision Diagrams compiler with complexity at most exponential in the tree width.

SUMMARY OF THE INVENTION

According to the present invention, a computer-implemented method of configuring a product based on an initial product model is provided. The initial product model comprises variables, wherein each variable is associated with a set of values, and wherein at least one of the variables is defined as a scope variable, and rules representing inter-dependencies among the variables and values. The variables and rules define a product configuration problem to be solved. The method comprises (i) a computer restricting the initial product model based on one selected value from the set of values of the at least one scope variable resulting in a remaining simplified product model, and (ii) the computer iteratively setting values for other variables not being scope variables based on the simplified product model.

According to another aspect a computer system for configuring a product based on a initial product model as described above is provided.

According to yet another aspect a non-transitory computer readable storage medium having computer program instructions stored therein, which, when executed on a computer system, perform the method as described above, is provided.

Further aspects are set forth in the dependent claims.

BRIEF DESCRIPTION OF THE FIGURES

The present invention will be described with reference to the accompanying figures. Similar reference numbers generally indicate identical or functionally similar elements.

FIG. 2 and FIG. 3 display the initial product model of an exemplary car configuration problem, wherein FIG. 2 shows the variables and rules of the initial product model and FIG. 3 depicts the sets of values associated with the variables.

FIG. 4 illustrates the rule EmissionEuro included in the exemplary car configuration initial product model of FIGS. 2 and 3.

FIG. 6 presents the time intervals that might be defined based on the rules EmissionEuro and EmissionUS included in the exemplary car configuration initial product model.

FIG. 7 illustrates the rule CurrencyFuel included in the exemplary car configuration initial product model.

FIG. 8 represents the rule GearBox included in the exemplary car configuration initial product model.

FIG. 11 illustrates the Boolean encoding of the exemplary car configuration initial product model.

FIG. 16 depicts the simplified rule EmissionUS included in the exemplary car configuration simplified product model.

DETAILED DESCRIPTION

Figure 1:
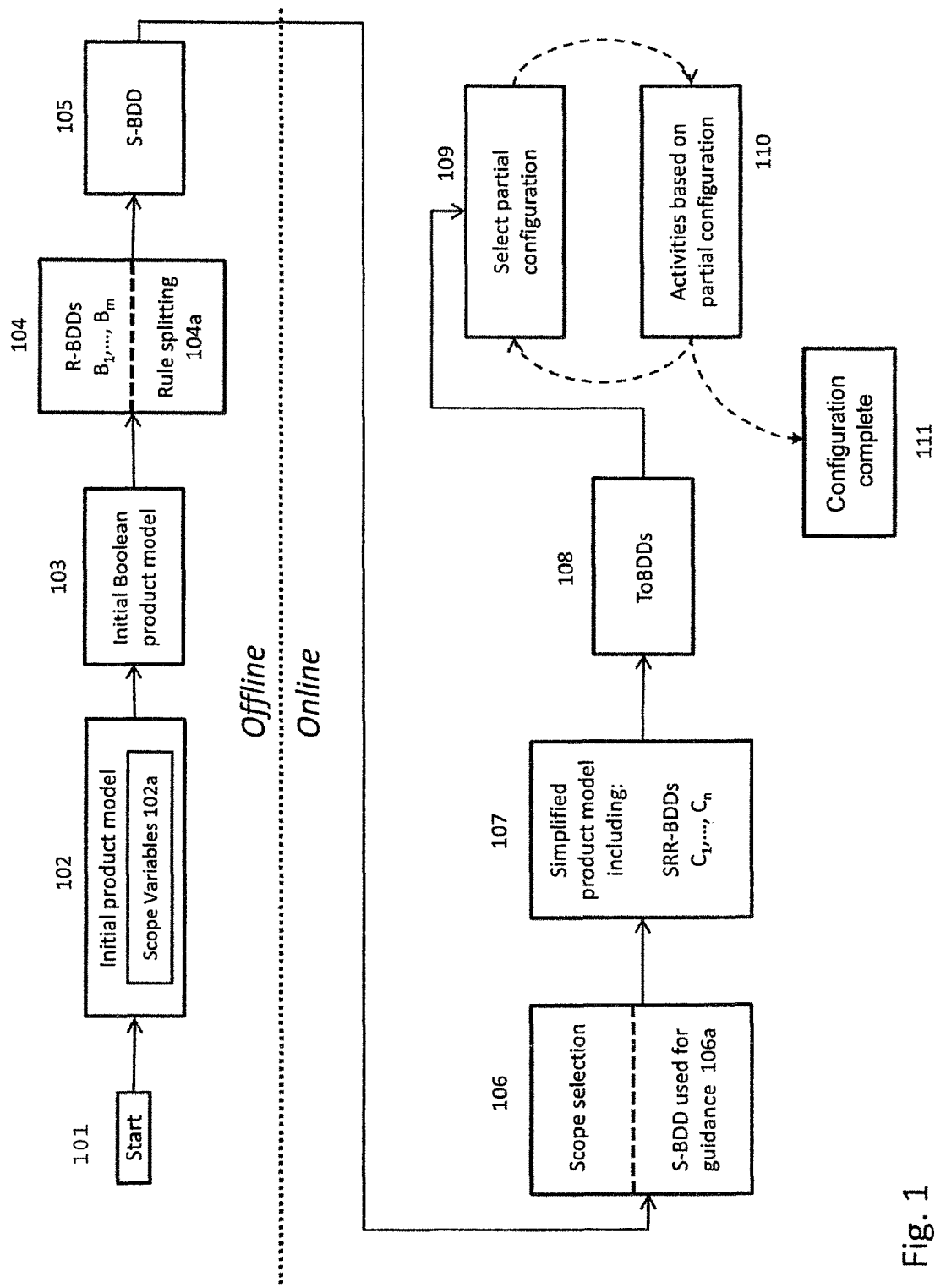
FIG. 1 shows a flowchart outlining an embodiment of the method of product configuration.

Before turning to the detailed description with reference to FIGS. 1 to 20, some general aspects will be set forth first The present invention generally relates to computer implemented methods of configuring a product based on a product model. In this context, the term "product" is to be understood broadly to cover any product article or goods as well as processes (e.g. manufacturing processes, business processes) which occur in more than one setup or configuration. Thus, product models may not only be used to represent configuration problems of tangible goods, but more generally to represent any kind of configuration problem such as process configuration problems.

On the one hand, configurable products are characterized by various variables (by the skilled person also referred to as parameters, feature families, or option groups), representing the various dimensions of the product to be configured. Each variable has an associated set of values (by the skilled person also referred to as domains, types, features, or options). For each of the variables, a particular value has to be selected out of the respective set of values in order to obtain a complete product configuration. On the other hand, there are inter-dependencies among various variables and values. These inter-dependencies are expressed by rules (by the skilled persons also referred to as constraints, or dependencies). Only if a selection of values for all variables of a product model fulfils all rules, this configuration is considered to be valid. To enable computer-implemented configuration, a product model including its variables, value sets and rules, is established in a structure form processible by a computer.

Generally speaking, a computer-based configuration of a product on the basis of a product model is generally performed by iteratively selecting values for the various variables and, e.g. after the value of one or several variables has been fixed, the computer checking the current configuration for consistency by applying the rules.

The product model represents an entirety of variables, with associated sets of values, and rules which defines a product configuration problem. According to the present invention, at least one variable of the product model is defined as "scope variable" (as will be described in detail below). The product model can further contain sub-structures, in which e.g. various variables or rules are grouped together. Additionally, several more features, like e.g. default values for some of the variables or mathematical functions depending on some variables might be provided in the product model.

An example of a consumer product that might be subject to product configuration is a t-shirt. The variables (associated set of values) of the t-shirt product model are its color (black, white, red, blue), its size (small, medium, large), and a particular print ("Men in black"-MIB, "Save the Whales"-ST) on the front of the t-shirt. Hence, there are 24 combinations among the values of the variables of the t-shirt product model that form possible complete t-shirt configurations. However, there are two rules that need to be fulfilled for a valid t-shirt configuration:
1) If the MIB print is chosen, then the color black has to be chosen as well.
2) If the small size is chosen, then the print STW cannot be chosen (as this print does not fit on the small shirt).

With these restrictions only 11 valid configurations out of the 24 possible complete t-shirt configurations remain:

| | | |
|---|---|---|
| (black, small, MIB) | (black, large, STW) | (red, large, STW) |
| (black, medium, MIB) | (white, medium, STW) | (blue, medium, STW) |
| (black, large, MIB) | (white, large, STW) | (blue, large, STW) |
| (black, medium, STW) | (red, medium, STW) | |

These 11 valid configurations form the solution space of the complete t-shirt product model, i.e. they display all combinations among the values of the variables of the t-shirt product model that fulfil all rules included in the t-shirt product model (in general, the solution space of an arbitrary product model includes all valid solutions of the arbitrary configuration problem, i.e. all combinations among the values of the variables of the arbitrary product model that fulfil all rules of the arbitrary product model).

The process of product configuration, i.e. the task of finding a combination among the values of all the variables included in the product model for which all rules of the product model are fulfilled, is important in many areas, as e.g. automotive, aerospace, high-tech, industrial machinery, industrial components, consumer products, medical equipment, mill products, chemicals, building and construction, software, energy, insurance, utilities, telecommunication, life sciences, or media, and fields of operations, as e.g. during the development and manufacturing of a product, for price calculations of a product, for canvassing, or customer relationship management. In general, whenever there is a complex product or process that needs to be handled in a smart way there is a need for a method of product configuration.

Depending on the complexity of a product, its computer-based configuration is a complex, computing-power-intensive and memory-demanding task. The configuration of a car, for example in the course of the development or manufacture/assembly of a car, may be regarded as a rather complex configuration problem. A typical car consists of several thousand parts, which are the potential variables of the car product model. For many of these parts, various different choices exist, which form the sets of values associated with the variables. Out of these choices car developers or manufacturers pick one for each part in order to develop/assembly the car. However, not all choices are compatible, e.g. if choices from different suppliers are used, they might not fit together. Additionally, there might be restraints regarding the costs of the car. For example, there might be an upper price limit on the engine of a car (in this case it could be useful to group all engine parts of the car together in a sub-structure of the product model). The entirety of restrictions among the parts and choices of the car is captured by the rules of the car product model. The variables, associated values, and rules of the car product model define a car model representing the solution space of a car development or car assembly configuration problem. For a typical car development or car assembly configuration problem the complete car model represents more than $1 \times 10^{20}$ valid combinations.

In the manufacturing industry such as car manufacturing, product configuration is used in various respects. For example, it is used during the actual manufacturing of a car in order to ensure that the car is assembled according to a valid configuration and to supply an assembly line with the correct parts. As an assembly line utilized for car manufacturing is usually arranged to execute the manufacturing process within pre-determined time intervals, also the car configuration employed within the assembly process is subject to time constraints. Thus, a product configuration utilized within an automated or semi-automated manufacturing process is required to meet given response or calculation times.

Moreover, product configuration is also used for offering products to potential customers. Well-known examples are the websites of car manufacturers which enable potential customers to configure a car according to their desires. The product configuration mechanisms used for such online configurations offered to end customers also have to respond within reasonable time intervals because long waiting times are not acceptable.

There are several methods known in the prior art for computer-implemented solutions of configuration problems. Some methods of the prior art do not ensure that all valid solutions of a configuration problem are maintained during a configuration process, i.e. some valid solutions may be lost in the course of configuration. Other methods of the prior art return too many (allegedly) valid solutions of a configuration problem. Yet other methods, like e.g. the already mentioned U.S. Pat. No. 7,584,079 B2, provide exactly all valid values and/or solutions of a configuration problem. However, U.S. Pat. No. 7,584,079 B2 solves a configuration problem by an iterative single process starting out from a complete product model. This approach is very challenging in terms of required computation resources for complex configuration problems. As a result, an upper limit of the complexity of configuration problems exists for this approach which is set by the available computation power and required response times.

It is an objective of the present invention to address those problems of the prior art. The method of product configuration presented herein is particularly directed to handle complex configuration problems in a more efficient manner in terms of computing resources and response times in comparison to the approaches known in the prior art.

The general idea of the invention is to perform the iterative configuration as described above on a reduced and therefore—compared with the product model of the product to be configured—simpler product model (for reasons of clarity, the complete product model prior to reduction is referred to as "initial product model" hereinafter). Such a reduced simplified product model is obtained by pre-defining a specific set of variables within the product model, herein referred to as "scope variables". Generally, the values of the scope variables are determined first resulting in a remaining, simplified product model, and the iterative further configuration is only performed subsequently, thereby effectively dividing the process of product configuration into two stages.

During the first stage, the values for scope variables are selected by the user by using a computer implementing the configuration process. The scope variables are pre-defined e.g. by a configuration expert (not the user of the product configuration) as a specific subset of variables of a product model. Hence, this subset of scope variables is defined in the product model, i.e. the designation of certain variables of the product model as scope variables forms an integral part of the product model. The computer implementing the configuration indicates the scope variables and associated values for selecting by the user. The selection of values for the scope variables during the first stage of the configuration process is, in some embodiments, an iterative process by itself. In this case, if more than one variable is defined as scope variable in the product model, the values for the scope variables are selected one after another and consistency, i.e. the rules relating to the scope variables, is checked by the computer. The iteration ends once values for all scope variables are selected and one or several consistent and valid scope variables are returned by the computer. Alternatively, in other embodiments, the values of all scope variables are selected in a single activity, i.e. without any consistency checks in between. In this case, a consistency check is applied by the computer after all scope variable values have been chosen. If it turns out that an inconsistent, invalid set of scope variable values has been selected (i.e. the rules relating to the scope variables are not fulfilled), the selection of scope variable values is repeated.

Hence, the values of scope variables are selected first, before the values of all other variables not being scope variables are selected. The latter ones, hereinafter also referred to as "non-scope variables", are iteratively selected only during the second stage of the configuration process.

As it is the function of the scope variables to simplify the product model at an early stage of the configuration process in order to accelerate the subsequent iterative further configuration activities (i.e. iterative selection of values for the non-scope variables), the scope variables (or at least some of them) are generally pre-determined and defined in the initial product model by taking into account their potential or effect of restriction and simplification of the complete product model. Variables leading to a substantial restriction of the initial product model are referred to as high-impact variables. In this context, defining high-impact variables to be scope variables implies that the selection of a value for such a scope variable results in a more significant simplification of the product model as compared to defining low-impact variables as scope variables.

For example, scope variables could be variables that define a particular market or market region of a product, a particular point in time associated to a product or a general product type. In the case of a car configurator, which may be used by a possible customer of a car manufacturer in order to configure its car (for example on the website of the car manufacturer), a reasonable scope variable could be the country the car is to be sold in. Choosing a particular country out of all possible countries, i.e. selecting a value for the scope variable country, e.g. selecting UK, automatically implies that the variable Steering Wheel is set to right and therefore excludes all possible so far valid configurations with Steering Wheel=left.

In the context of simplification of the product model based on scope variables also the number of scope variables is to be determined in the course of defining the initial product model. While at least one scope variable is required for the simplification of the product model, the number of scope variables should not be too high, either. In the case too many scope variables exist the simplification of the product model based on the scope variables itself becomes challenging in terms of required computation resources, which results in long response times for the computer calculating the transition to the simplified product model. Consequently, the number of scope variables is a trade-off between the achievable simplification of the product model and reasonable response times for the transition from the initial to the simplified product model and more efficient iterative further configuration in the second stage of the configuration process on the basis of the simplified product model. The number of scope variables has to be reasonable and depends on the particular product model. For a rather complex product model such as a car product model, a reasonable number of scope variables is e.g. in the range of two to five.

In this manner, the selected values of the scope variables are used by the computer to restrict the complete product model, which includes all variables, sets of values and rules of the product configuration problem, to a simplified product model. In the simplified product model the selected values for the scope variables are reflected. Consequently, the simplified product model generally includes fewer variables and/or associated subsets of values as the initial product model since the scope variables are not included as variables in the simplified product model anymore (the scope variables with selected values can still be included in the simplified product model though, however, not as a selectable variable). Furthermore, based on the selection and setting of values of the scope variables (hereinafter referred to as "scope setting") the rules of the simplified product model are restricted, compared to the rules of the initial product model. The variables, associated sets of values, and rules of the simplified product model effectively define a simplified product configuration problem. The simplified product model might still include default values for variables, mathematical functions or other features, as defined in the complete product model.

In the course of restricting the rules, each individual rule of the initial product model may be checked regarding a possible influence of the scope setting on the rule. In the case an effect of the scope setting on the rule is found, the rule is revised in order to be consistent with the scope setting. Since the simplified product model includes fewer variables than the complete product model, it can be expected that the restricted rules are generally less complex than the original rules. As a result of the scope setting, some rules can even become redundant; these rules are deleted in the process of restricting the rules.

Assuming for example, that the variable size of the above mentioned t-shirt configuration problem is defined as a scope variable. During the scope setting, the variable size is set to the value large. As a consequence, the second rule (If the small size is chosen, then the print STW cannot be chosen) of the complete t-shirt product model becomes redundant. This rule is not included anymore in the simplified product model of the t-shirt configuration problem.

The restricted rules generally are of reduced complexity in terms of causing computational calculation effort compared to the rules of the complete product model. As a consequence, complex rules which have been part of the initial product model can be processed in a more efficient manner in terms of computational resources in the remaining process of a product configuration.

As mentioned above, configuration problems can be very complex and include a large number of variables and rules. A plurality of these rules can be interlinked with each other, forming a complicated network of inter-dependencies. In this case, optionally, some embodiments apply propagation/synchronization methods between the rules during their restriction. An exemplary propagation method frequently used in this context is the so called unary constraint propagation, in which a constraint that is defined only over one variable (a so called "unary-constraint") is conjoined (logical AND) with any other rule depending on this variable. After such an operation the unary-constraint becomes redundant and is removed. As a result of a restriction employing propagation/synchronization methods the number of rules in the simplified product model may change with respect to the complete product model. Depending on the particular propagation/synchronization method used, the number of rules can either decrease (the number of rules can also decrease during restriction of the rules without propagation/synchronization methods being employed, due to redundant rules) or also increase.

Similar to the initial product model, the simplified product model arising from the computer-implemented restriction based on the scope setting is generated in a structured, computer-readable and computer-processable form, as it serves as the basis for the second stage of the configuration, the computer-based iterative selection of variables not being scope variables (from here on referred to as "non-scope variables") and iterative computer-implemented further narrowing down the solution space of the configuration problem.

Subsequent to the restriction of the initial product model to the simplified product model, the values for the non-scope variables are selected and set, i.e. the values of the variables are fixed. The selection of the non-scope variables is an iterative process. This means that the values for the non-scope variables are selected (either by a user or automatically) one after another and respectively set by the computer performing the configuration process. The iteration ends at the latest once values for all non-scope variables are selected, i.e. if the product configuration is completed.

Optionally, the method of product configuration includes the conversion of the initial product models into an initial Boolean product model (which is one example of a computer-readable and computer-processable representation of the variables and associated values of the initial product model). The result of this conversion is an initial Boolean product model including all variables, associated values, and rules of the initial product model, wherein all variables are Boolean, i.e. the values associated to the variable are the Boolean values true and false (or 1 and 0). During the conversion of the product model the rules of the product model are converted as well, into being Boolean rules over the Boolean variables. The conversion of a product model into a Boolean product model is described in more detail further below and, for example, in the above mentioned U.S. Pat. No. 7,584,079 B2.

In some embodiments, a Rule Binary Decision Diagram (R-BDD) is built for each Boolean rule included in the Boolean product model; a Binary Decision Diagram (BDD) is a rooted directed acyclic graph with two terminal nodes marked as 0 and 1, respectively. An R-BDD is a logical description of a rule included in the initial product model based on the dependent variables of the respective rule. The entirety of generated R-BDDs represents the rules of the initial product model. The generation of R-BDDs based on a Boolean product model is described, for example, in the above mentioned U.S. Pat. No. 7,584,079 B2. As the Boolean representation of variables and associated values, also the R-BDDs are established in a computer-readable and computer-processable form in order to be processed by the computer implementing the configuration method.

The R-BDDs representing the rules of the initial product model may be restricted based on the selected values of the scope variables. This restriction results in restricted R-BDDs representing restricted versions of these rules. These restricted R-BDDs are hereinafter referred to as Scope Restricted Rule Binary Decision Diagrams (SRR-BDDs). In the process of restricting the R-BDDs to the SRR-BDDs the selected values for the scope variables (which generally are presented to the user in a readable, non-Boolean form) are mapped to their corresponding Boolean values. Subsequently, the R-BDDs are restricted based on the scope values in Boolean form. The above, more general, remarks on restricting the rules of the initial product model to obtain the rules of the simplified product model analogously apply to the restriction of the R-BDDs to the SRR-BDDs. The R-BDDs are a representation of the rules of the initial product model, while the SRR-BDDs represent the restricted rules of the simplified product model. The restriction may not merely restrict each individual R-BDD one-to-one to an SRR-BDD. The optional use of propagation/synchronization methods between various rules further simplifies the rules and generally results in a change (decrease or increase) of the number of SRR-BDDs as compared to the number of R-BDDs.

Optionally, in some embodiments, a particular (computer-readable and computer-processible) representation of the simplified product model obtained by the restriction achieved by selecting values for the scope variables is established, namely a Tree of BDDs (ToBDDs). More specifically, the ToBDDs is a representation of the rules of the simplified product model; the valid solutions of the product configuration problem represented by the simplified product model are incorporated into the ToBDDs. The generation of a ToBDDs is described in detail further below or, for example, in the above mentioned [TuBBDs2005]. If a ToBDDs is generated, the iterative selection of values for variables not being scope variables during the second stage of the configuration process is based on the ToBDDs.

Optionally, in some embodiments, a particular (computer-readable and computer-processible) representation hereinafter referred to as a Scope Binary Decision Diagram (S-BDD) is generated if at least two variables of an initial product model are defined as scope variables. Such an S-BDD is provided in order to support a user of the configuration method in iteratively selecting a combination among the values of the scope variables for which the complete product configuration problem has at least one valid solution. One can understand the selection and setting of scope variables to be a "small" configuration problem on its own, defined by the scope variables with associated sets of values and the rules related to the scope variables, which is embedded in the complete product configuration problem. The S-BDD is a representation of the valid solutions of the small configuration problem. The S-BDD might be understood as a projection of the solution space of the complete product configuration problem onto the scope variables, i.e. the valid solutions of the "small" configuration problem represented by the S-BDD are compatible with all the rules included in the complete product model.

After the selection of a value of a first scope variable out of a plurality of scope variables during the scope setting the S-BDD is used to determine a subset of valid values out of a set of values associated to a second scope variable. In other words, the values for the remaining scope variables are restricted to only these values which are still selectable to fulfil the rules. The subset of valid values determined for the second scope variable may be provided to the user before selecting a value for the respective scope variable. By selecting a value which is included in the subset of valid values it is assured that the scope setting is consistent with the already selected scope variables; in the case that the S-BDD is a projection of the solution space of the initial product model on the scope variables even with the complete product configuration problem. In this way, the S-BDD can be used in order to support a user during the complete iterative process of scope setting.

Optionally, the selection of values for the non-scope variables includes so-called partial configurations. A partial configuration is a subset of some non-scope variables. The values of the variables included in a partial configuration are selected before the values of the other non-scope variables not being part of the partial configuration are selected. Based on the selected values for the variables forming the partial configuration various activities may be performed. These activities include a variety of queries performed by the computer implementing the configuration method, in which the simplified product model may be queried to:

Verify whether the partial configuration is consistent with the rules of the simplified product model.

This activity verifies, by consulting a representation of the simplified product model, if the selected values of the variables of the partial configuration are valid, i.e. if they fulfill all rules included in the simplified product model; in other words, the partial configuration is valid, if the solution space of the simplified product model includes at least one combination of values which has all values of the partial configuration in it.

The answer to this activity might be yes, in the case the partial configuration is valid, or no, in the case the partial configuration is not valid.

Attempt an automatic solution of the product configuration problem.

This activity tries to automatically complete the product configuration. The complete product configuration includes the selected values of the scope variables, the selected values of the variables of the partial configuration, and additionally values of all non-scope variables which are not part of the partial configuration. The values of the latter variables are selected automatically. On the basis of the solution space of the simplified product model it is thereby assured that the generated complete configuration is valid. If default values for some of the non-scope variables which are not part of the partial configuration are specified in the complete product model, these values (which are also part of the simplified product model) might be automatically selected for the variables, in the case they do not conflict with the already selected values of other variables.

The answer to this activity might be the generated complete product configuration. Optionally, information can be provided whether the value of a variable of the complete configuration was selected and set during the scope setting, during the partial configuration, or automatically during the automatic solution. It might also be indicated if a value selected during the automatic solution was specified as default value or not. If no valid complete configuration can be generated automatically on the basis of the selected values of scope variables and variables of the partial configuration, the answer to the query may be empty an error message and/or may include information concerning the invalidity of the configuration.

Determine consistent values for remaining variables not being scope variables and not being already selected variables.

This activity generates subsets of values for variables not being selected variables (a selected variable is a variable for which a value was already selected). Non-selected variables are, in this context, generally non-scope variables and also not part of the partial configuration. The subsets of values only include values for which at least one valid solution of the configuration problem exists. The generated subsets of values may be updated after each selection of a value for a variable previously not being selected.

The answers to this activity might be the generated subsets of values associated to non-selected variables. Such a subset may be provided together with those values of the respective non-selected variable leading to an invalid configuration. In this case it is indicated which values are part of the generated subset and which not.

Determine inconsistencies caused by the selection of values for variables.

This activity checks the current partial configuration for inconsistencies and, if such inconsistencies are found, provides respective reasons. If it is found that a partial configuration is inconsistent with the rules of the simplified product model, an explanation for the inconsistency of the partial configuration may be provided by this activity. The explanation can include a list of values and/or variables, the values associated with the variables conflicting with the rules of the simplified product model. The values and/or variables included in the list may correspond to a minimum set of values that needs to be changed in order to resolve the inconsistency of the partial configuration, i.e. to obtain a consistent, i.e. valid, partial configuration.

The answer to this activity might be the generated list of values and/or variables corresponding to those values of the partial configuration which need to be changed in order to obtain a valid partial configuration.

Determine a number of possible consistent solutions to the product configuration problem.

Based on the partial configuration there might be several combinations of selecting the non-selected variables in order to obtain a valid complete configuration. In this activity an absolute number of possible valid complete configurations corresponding to the partial configuration is determined.

The answer to this activity might be the determined absolute number of valid complete configurations that are possible on the basis of the partial configuration.

Calculate a result based on a mathematical function included in the simplified product model.

This activity uses a mathematical function included in the simplified product model in order to calculate a result. The mathematical function might depend on some scope variables and/or some variables of the partial configuration. The selected values for these variables are required in order to calculate the result.

The answer to this activity might be the result of the calculation.

These queries may be initiated by user supervising the configuration or may be performed automatically by the computer. In either case, the computer performs the queries, makes the necessary determinations and, optionally, returns the results back to the supervising user.

Optionally, in some embodiments, in the course of restricting the initial product model to the simplified product model, a rule included in an initial product model or in a simplified product model is split into a plurality of rules. The resulting plurality of rules replaces the rule in the complete product model. The rule included in the initial product model may generally depend on a plurality of variables of the complete product model. By splitting the rule into a plurality of rules the number of depending variables of the rule may be reduced. An example of rule splitting is given further below with reference to FIGS. 6 to 8.

The splitting of a rule into a plurality of rules, each of the plurality of rules depending on fewer variables than the rule, might help to further decrease the computational complexity of a product configuration problem. For example, the rule splitting potentially results in a reduced tree-width of the ToBDD representing the simplified product model. Since the computational methods of solving a product configuration problem based on a ToBDD are in a worst case scenario—exponential in the tree-width, rule splitting may encompass handling more complex product models that cannot be handled using the methods known in the prior art within reasonable time constraints (assuming availability of similar computation resources).

Optionally, in some embodiments, a rule included in an initial product model is assigned with a time interval defining the validity of the rule. As a consequence, the rule might only be effective, if the product configuration is defined to be valid only within this predefined time interval. Hence, a plurality of different rules may define the relations between the same variables, the different rules being effective for disjoint time intervals and/or points of time. Other rules may define a dependency of variable values on a date or time interval. For such time-related rules, a particular handling of the time-domain-related variables and their usually broad value ranges/sets is proposed, which is explained in more detail below.

Optionally, as already mentioned above, default values for some of the variables are provided in the product model. If default values for scope variables are provided, these default values might be automatically assigned to the scope variables. However, a user of the configuration method can manually overwrite the default values and select other values for the scope variables during the scope setting.

In addition, in some embodiments, the product model includes default values for one, a plurality or all variables not being scope variables. These default values are presented to the user while iteratively performing the further configuration during the second stage, i.e. the configuration based on the restricted, simplified product model which is e.g. represented by a ToBDDs as explained above. In each iteration, the user is free to accept the default value of a variable or to overwrite it with the desired different values. Furthermore, the default values for non-scope variables might be used while attempting an automatic solution in the case of a partial configuration (see above).

Optionally, in some embodiments, the mechanisms of product configuration as described above are at least partly performed on a configuration server. In some embodiments, the configuration server is accessible to end users e.g. via a wide area network (WAN) such as the Internet or a local area network (LAN), the end users being equipped with client devices such as personal computers (PCs), laptops or smartphones with respective client software. In particular, the selection of values for the scope variables as well as for the non-scope variables, and the restriction of the initial product model to the simplified product model might be performed on such an online accessible configuration server.

Online accessible configuration allows several people to participate in configuring a product, either subsequently or in parallel, effectively resulting in a collaborative configuration environment allowing distributed configuration. For example, several client devices may be logged in to the configuration server at the same time for a particular configuration, one client device actively driving the configuration while the other client devices tracking/monitoring the configuration results. This might be desirable in the case of complex configuration problems, e.g. the above mentioned development of a car.

Now turning to the more detailed description, FIG. 1 shows a flowchart of an embodiment of the method of configuring a product described above. The starting point for applying the method of product configuration is a complete configuration problem 101. Such a configuration problem could, for example, be the configuration of a car.

The complete configuration problem is defined by an initial product model 102. All variables of the configuration problem, for each of which a value has to be selected out of an associated set of values, are included in the product model. The inter-dependencies among variables and values of the initial product model are represented as rules, and also included in the initial product model 102. Several more features, e.g. default values for variables, mathematical functions depending on variables of the product model (such as functions implementing price (re-)calculations of the product), etc., are included in the initial product model 102 as well. Some variables of the product model are defined as scope variables 102a. An exemplary initial product is described more specifically with reference to FIGS. 2 to 14.

Figure 2:

FIG. 2 illustrates an exemplary initial product model 102 of a car configuration problem. Six variables for which a user of the configuration method may select values are included in the product model, namely:

Country, specifying the country a car is supposed to be sold in.
Currency, specifying the currency in which a payment is supposed to be made.
EmissionStandard, specifying the emission standard a car needs to fulfil.
Engine, specifying the engine of a car.
Fuel, specifying the fuel type used by a car.
GearBox, specifying the gearbox of a car.

At least one of these variables is defined as scope variable 102a in the initial car configuration product model 102, as it is discussed in more detail further below.

A seventh variable, named Date, is included in the initial product model 102 as well. This variable is used to specify a time when a generated car configuration is valid, for example, in order to determine the set of date-dependent rules which is to be applied to the variables. The value for this variable is selected either automatically (e.g. by taking the current time at which the configuration is being made) or manually by the user.

The car product model displayed by FIG. 2 further includes four textual rules listed in the "Rules" section, named EmissionEuro, EmissionUS, GearBox, and US_Petrol. Textual rules are rules defined by a text in any preferred programming language. Furthermore, two relational rules are listed in the ""Relation" section of the product model, named CurrencyFuel, and FuelEngine. Relational rules are defined by a table of allowed combinations over some variables of the product model. Additionally, the car product model features a mathematical function named Price.

Figure 3:
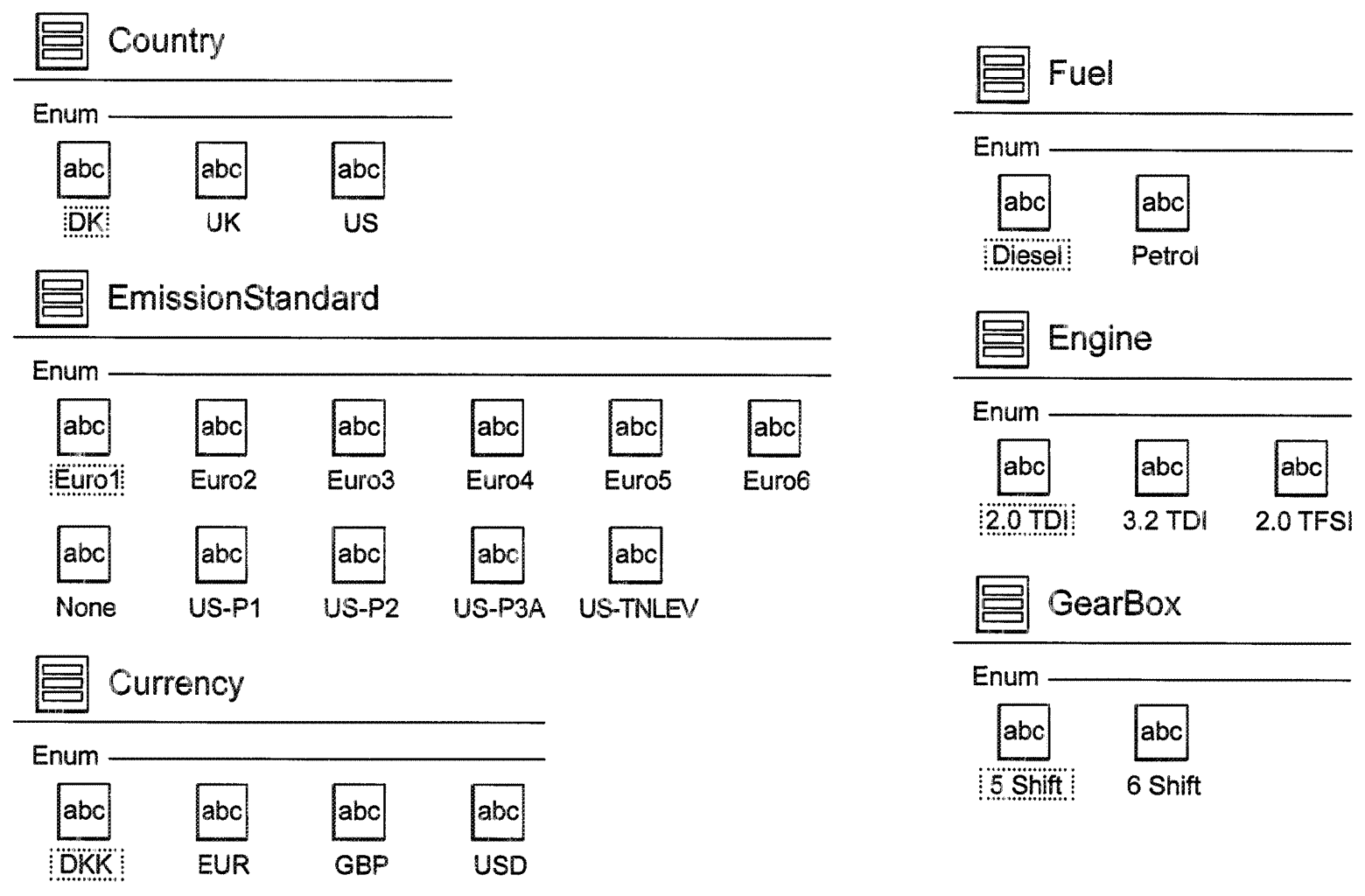

FIG. 3 indicates the sets of values associated to each of the variables of the product model of FIG. 2:

As Country Denmark (DK), United Kingdom (UK), or United States of America (US) may be selected.
As EmissionStandard Euro 1 to Euro 6 may be selected, as well as US-P1, US-P2, US-P3A, or US-TNLEV. It may also be specified that None emission standard needs to be fulfilled.
As Currency Danish krone (DKK), Euro (EUR), British Pound (GBP), or US Dollar (USD) may be selected.
As Fuel Diesel or Petrol may be selected.
As Engine 2.0 TDI, 3.2 TDI, or 2.0 TFSI may be selected.
As GearBox 5 Shift or 6 Shift may be selected.

FIG. 4 depicts a screenshot of the textual rule EmissionEuro of the product model of FIG. 2. The rule is valid for DK and UK. Based on the value of the variable Date of the configuration this rule specifies the appropriate EmissionStandard. The format used to represent time is a datetime-string (YYYY-MM-DD HH:NN:SS), where YYYY refers to a year, MM to a month, DD to a day, HH to an hour, NN to a minute, and SS to a second.

Figure 5:
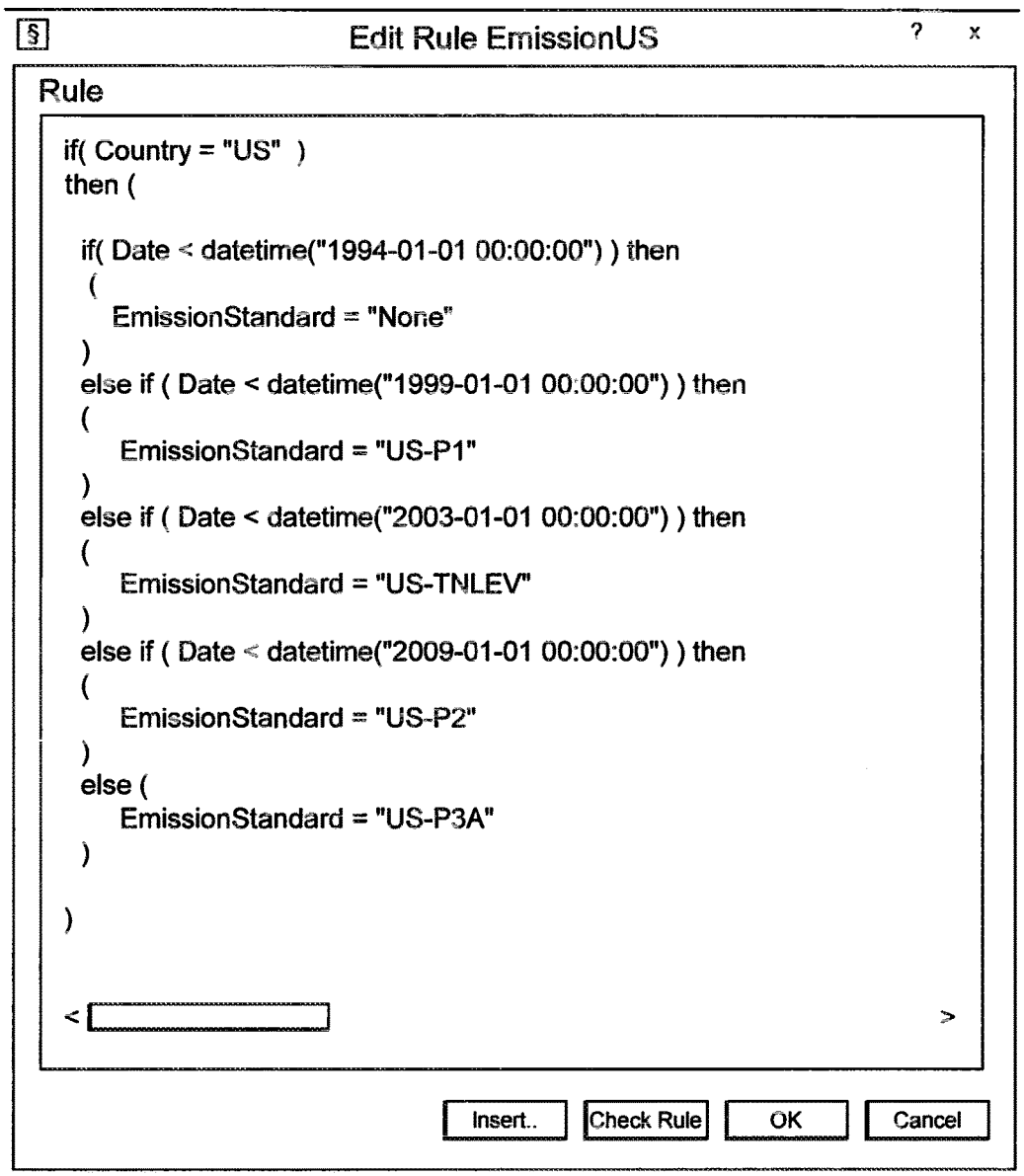
FIG. 5 depicts the rule EmissionUS included in the exemplary car configuration initial product model.

FIG. 5 shows a screenshot of the textual rule EmissionUS of the product model of FIG. 2. This rule, which is constructed in an analog manner to the EmissionEuro rule, represents the appropriate EmissionStandard for the US in dependence of the variable Date.

Both of the above mentioned emission rules of the product model ensure that a configured car corresponding to a valid car configuration always meets at least a minimum legal emission standard, e.g. the standard at the time of the car configuration or at a point of time in the past or in the future. If a user of the configuration method selects a value not corresponding to the valid rule for the variable EmissionStandard, the resulting car configuration will not be valid (as it does not fulfil said valid emission rule).

Optionally, these datetime-strings occurring in a rule are handled in a specific way. Time is divided into discrete time intervals based on the definition of datetime-strings in the rule, thereby splitting the time domain into relevant points of times and/or time intervals for a particular time-related variable referred to by a rule.

As shown by the example of FIG. 4, a rule might specify or utilize one or more points of time. In FIG. 4, the EmissionEuro rule uses time-related "if" clauses on the value of the Date variable in order to determine the correct value of the EmissionStandard variable. A list of time intervals is established for such a rule. For each point of time, e.g. in form of a datetime-siring, referred to by the rule, a time-stamp (e.g. again in form of a datetime-string: YYYY-MM-DD HH:NN:SS) is added to the list of time intervals. If X different points of time occur in the rule, then X time-stamps are added to the list of time intervals. Subsequently, time intervals defined by these time-stamps are added to the list. The first time interval defined by the first point of time might be an open interval starting at minus infinity or a closed interval starting at an arbitrary point of time (not specified by the rule). Similarly, the last time interval defined by the last point of time might be an open interval ending at infinity or a closed interval ending at an arbitrary point of time (not specified by the rule). As a result of this method X+1 time intervals are generated. Consequently there are in total 2X+1 entries on the list of time intervals.

In some embodiments, the generated entries in the list of time intervals are used as discrete values for the Date variable.

In some embodiments of the method of handling datetime-strings, the points of time are merged with the previous or following time interval.

In the examples of the EmissionEuro rule and the EmissionUS rule (see FIGS. 4 and 5, respectively), ten different datetime-strings occur in the rules in total (six in EmissionEuro and 4 in Emission US). Therefore, ten points of time given by these datetime-strings are added to the corresponding list of time intervals. Additionally, eleven time intervals are generated based on the ten points of time. Consequently, the list of time intervals corresponding to both rules has in total 21 entries (FIG. 6). Here, the time interval "]-inf;1992-06-30 23:59:59]" refers to the time period before 1 Jul. 1992 (without specifying an arbitrary lower boundary, "]-inf" referring to minus infinity and thus specifying an open lower end), and the time interval "[2014-09-01 00:00:01; in/f]" refers to the time period starting from 1 Sep. 2014 00:00:01. The 21 entries in the list of time interval effectively decompose the time domain, e.g. for the variable Date of the car product model of FIG. 2, into relevant intervals/points.

This handling of time is, for example, useful for a compiler to re-encode the whole time domain (as a time-related variable may be assigned with a value indicating any arbitrary point of time) as a finite list of time intervals and points. Thus, the usually vast value set/range of a time-related variable can be decreased to certain relevant short list. This enables efficient pre-computation of solutions to the configuration problem. Furthermore, it is also useful for constructing product models in the first place, prior to any configuration. A modeling person can inspect the relevant time intervals and points of time resulting from the rules analysis. Unexpected dates or intervals may point to potential inconsistencies or mistakes in rules.

FIG. 7 displays a screenshot of the relational rule CurrencyFuel of the car configuration problem. In this rule the allowed combinations of values of the variables Currency and Fuel are specified for each Country. According to this rule it is, for example, excluded to configure a car which is supposed to be sold in Denmark, paid in Euros, and to be fueled with Petrol (the reason for that might be that for a particular car manufacturer the market for Petrol-cars is too small, so that it has decided not to offer any Petrol-cars in Denmark).

FIG. 8 depicts a screenshot of the textual rule GearBox. The rule uses "if" clauses to define that the 2.0 TDI (Engine) and the 3.2 TDI (Engine) can only be used with a 6 Shift (GearBox).

Figure 9:
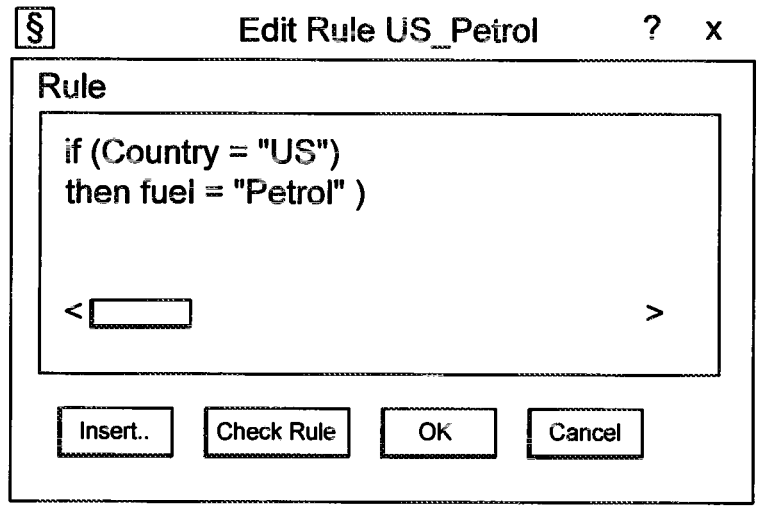
FIG. 9 displays the rule US_Petrol included in the exemplary car configuration initial product model.

FIG. 9 shows a screenshot of the textual rule US_Petrol. The rule uses "if" clauses to define that the only valid Fuel in the US (Country) is Petrol.

Figure 10:
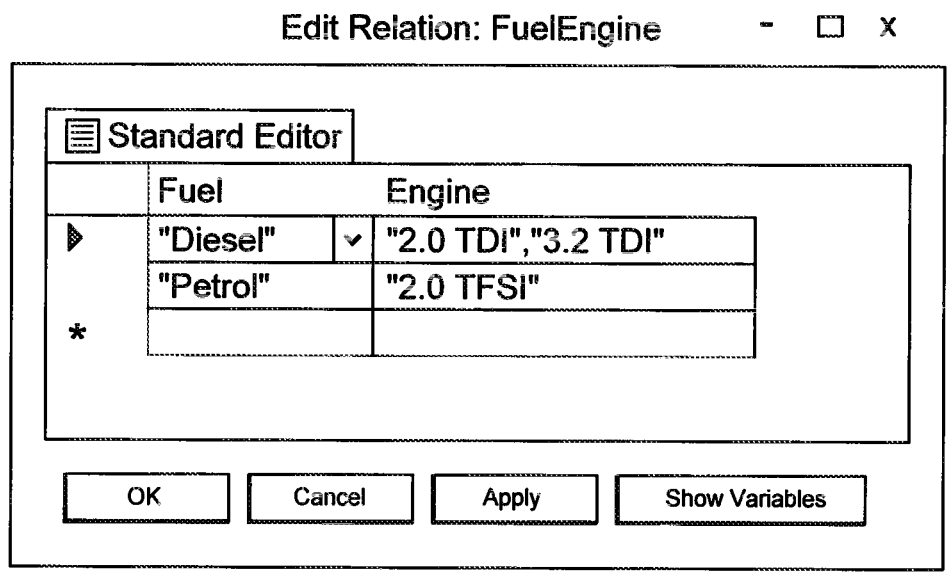
FIG. 10 shows the rule FuelEngine included in the exemplary car configuration initial product model.

FIG. 10 illustrates a screenshot of the relational rule FuelEngine. The rule indicates that the 2.0 TDI (Engine) and the 3.2 TDI (Engine) can only be fueled with Diesel, while the 2.0 TFSI (Engine) can only be fueled with Petrol.

Referring back to FIG. 1, the initial product model 102 will generally first exist in a descriptive, potentially informally defined format that is neither readable nor processible by a computer. In order to serve as the basis of a computer-implemented configuration, it is transformed into a formal representation such as a initial Boolean product model 103. In the initial Boolean product model 103 all variables are Boolean, i.e. the values associated to the variables are the Boolean values true and false (or 1 and 0, or high or low). The rules of the initial Boolean product model 103 are also Boolean, depending on the Boolean variables.

FIG. 11 provides an overview of the Boolean encoding of the variables of the car product model of FIG. 2. The variables of the car product model are encoded by 17 Boolean variables (numbered 0 to 16), in total. The number of Boolean variables required to encode a particular variable of the product model depends on the amount of values associated to the variable. For example, the variable EmissionStandard has eleven associated values (i.e. domain size=11), which need to be encoded by Boolean variables. This requires eleven combinations of Boolean variables, and therefore four Boolean variables (four Boolean variables provide $2^4=16$ combinations>11 combinations). The four Boolean variables used to encode the EmissionStandard rule are the variables 9, 10, 11 and 12.

Figures 12A, 12B, 12C, 12D:
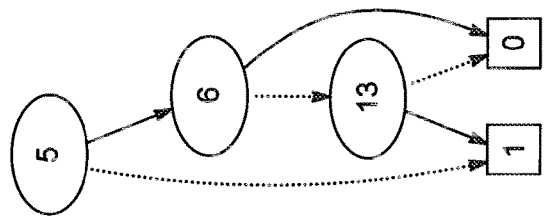
FIG. 12 a) to d) demonstrate the generation of an R-BDD based on the US_Petrol rule of the exemplary car configuration initial product model.
Figure 13:
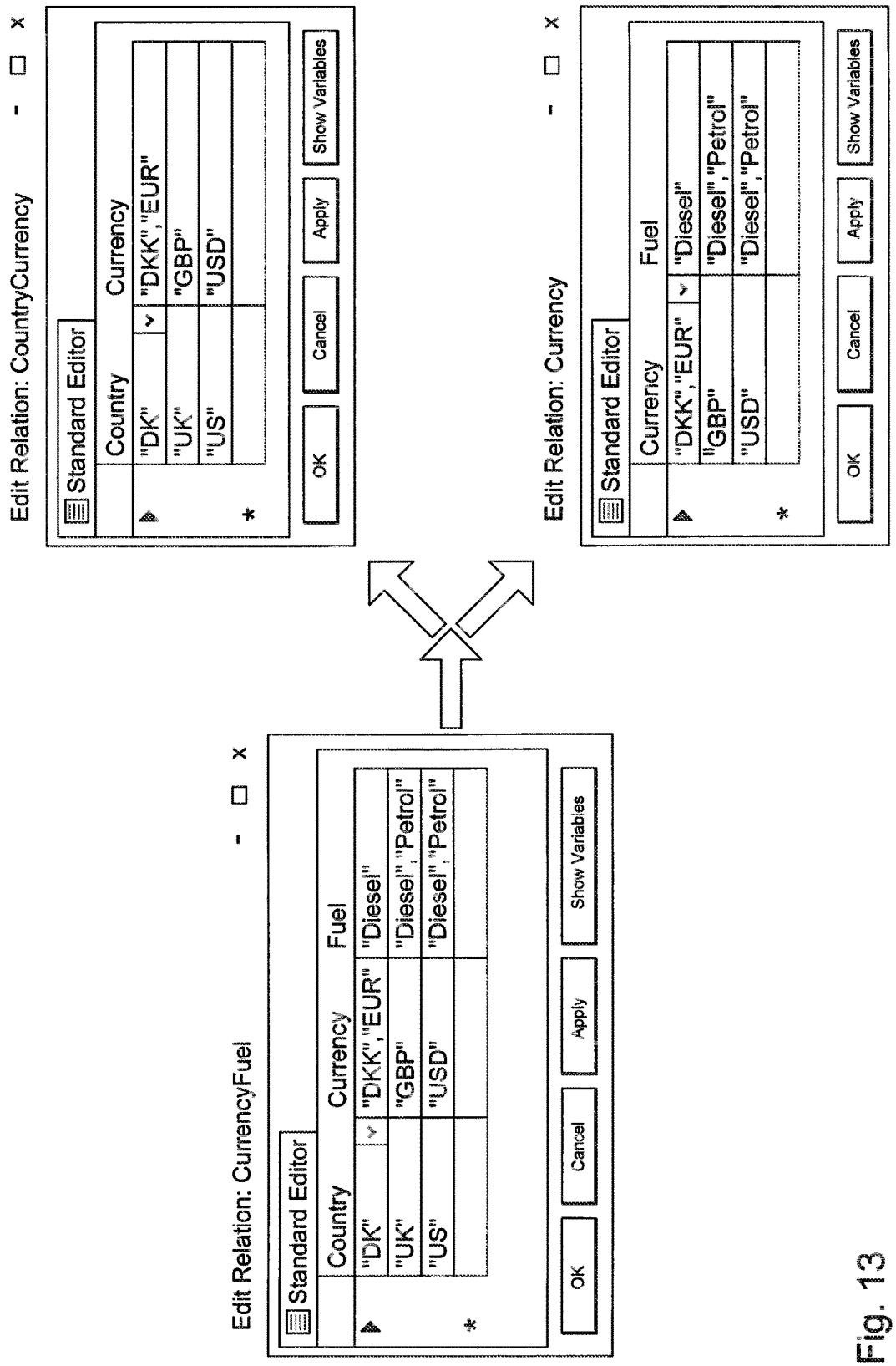
FIG. 13 illustrates the splitting of the rule CurrencyFuel of the exemplary car configuration initial product model into the rules CountryCurrency and Currency based on screenshots of the respective rules.

Based on the initial Boolean product model 103 an R-BDD 104 is generated for each rule of the initial Boolean product model 103. FIG. 12 exemplary illustrates the generation of the R-BDD for the US_Petrol rule of the initial product model of FIG. 2. As can be seen in FIG. 12 a) the US_Petrol rule defines the dependency between two variables, Country and Fuel. The Boolean encoding of the values of the respective variables is displayed in FIG. 12 b). For the Boolean encoding of the variable Country with its three associated values DK, UK, and US the Boolean variables 5 and 6 are used, while for the Boolean encoding of the Fuel variable with its two associated values Diesel and Petrol one Boolean variable, 13, is sufficient. The six possible combinations among the two variables are depicted in the table of FIG. 12 c). The table additionally indicates the combination of Boolean values for each combination of values of the variables Country and Fuel, as well as if a combination is allowed by the US_Petrol rule or not. FIG. 12 d) finally shows the R-BDD representation of the US_Petrol rule. In the R-BDD, each Boolean variable is represented by a node. Each node has two outgoing paths; a dashed one representing the low end (i.e. 0=Boolean false), and a solid one representing the high end (i.e. 1=Boolean true). For all combinations allowed by the US_Petrol rule the path from the root node of the BDD (here Boolean variable 5) to the bottom reaches the 1-terminal node, while the forbidden combinations or combinations not defined by the variable values indicated by the table of FIG. 12c) (such as the two combinations with Boolean variables 5 and 6 both set to 1, as such a value is not defined for the variable Country) terminate at the 0-terminal node.

In some embodiments the R-BDDs 104 representing the rules of the initial product model 102 are subject to an optional Rule splitting 104a. In this process, complex rules defining dependencies between a plurality of variables are decomposed into sets of simpler rules possibly defining dependencies between only fewer variables than the original rules. Rule splitting 104a generally reduces the computational complexity of the configuration problem in the subsequent parts (i.e. the second stage) of the configuration process, as a reduction of dependent variables in rules might reduce the tree-width of the ToBDDs 108.

Figure 14:
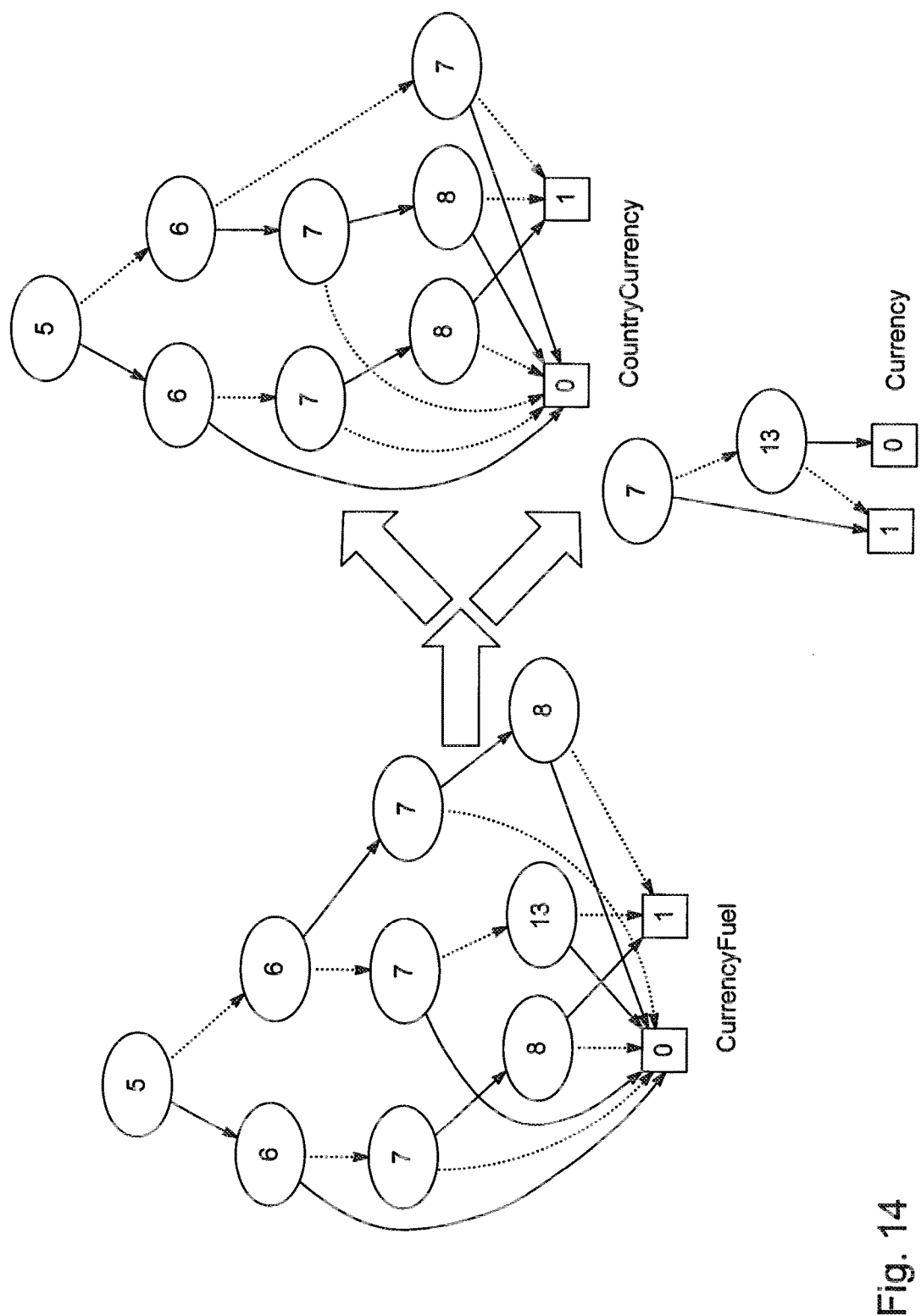
FIG. 14 depicts the splitting of the rule CurrencyFuel of the exemplary car configuration initial product model into the rules CountryCurrency and Currency based on R-BDDs of the respective rules.

In the car configuration example, relational rule CurrencyFuel depicted by FIG. 7 is split into two simpler rules. The rule splitting process, including screenshots of the original CurrencyFuel rule and of the two simpler rules resulting from this split, is displayed in FIG. 13. The original CurrencyFuel rule is more complex as it defines a relationship between values of the three interrelated variables Country, Currency, and Fuel. It stipulates that if the value of the variable Country is set to DK, the valid values of the variable Currency are DKK and EUR and the valid value of the variable Fuel is Diesel. If, however, UK is selected as Country, the only valid value for Currency is GBP, while Fuel may take the values of Diesel and Petrol. For US only USD can be selected as valid Currency, while both Diesel and Petrol are valid values of the Fuel variable (however, the combination US and Diesel is forbidden by the US_Petrol rule). This rule is split into two more simple rules which both only associate two dependent variables. The first resulting rule referred to as CountryCurrency defines the relating between Country and Currency (Country=DK→Currency=DKK or EUR; Country=UK→Currency=GBP; Country=US→Currency=USD). The second resulting rule called Currency is directed to the variables Currency and Fuel (Currency=DK or EUR→Fuel=Diesel; Currency=GBP→Fuel=Petrol or Diesel; Currency=USD→Fuel=Diesel or Petrol). FIG. 14 shows the same rule splitting process of FIG. 13; however, the respective rules are not displayed as screenshots, but by an R-BDD representation.

In some embodiments, rule splitting 104a is mainly employed to complex rules depending on a plurality of variables. In some embodiments of rule splitting a complex (textual) rule is split into several resulting rules based on the structure of the Boolean function encoded by the R-BDD representing the rule. An R-BDD representing a rule is taken as input, and a list of R-BDDs representing the resulting rules is returned by the rule-splitting algorithm.

In detail, these embodiments of rule splitting 104a might look as follows:

Given two R-BBDs $b_1$ and $b_2$, and some variables J of the R-BDD $b_1$:
"$b_1 \times b_2$" denotes the conjunction operation (logical AND) between the two R-BBDs.
"$b_1 + b_2$" refers to the disjunction operation (logical OR) between the two R-BDDs.
"Proj($b_1$,J)" is the resulting R-BDD generated by existential quantification of all the variables of R-BDD $b_1$ other than those belonging to J.

The following pseudo-code illustrates a particular implementation example for splitting an R-BDD into two R-BDD. The splitting-process is an iterative application of this method on each resulting R-BDD. It ends, if no resulting R-BBD can be split anymore by the method.

| Rule Splitting Method (R-BDD r) |
| --- |
| 1. Let the variables in r be: $V_r$ = { $v_1, v_2, v_3, ..., v_k$ } |
| 2. For two variables a and b in $V_r$ |
| 3.    If ( ( Proj( r, $V_r\setminus\{b\}$ ) x Proj( r, $V_r\setminus\{a\}$ ) ) = r ) |
| 4.    // a & b are candidates for splitting |
| 5.    $V_a$ := $V_r \setminus \{b\}$ |
| 6.    $V_b$ := $V_r \setminus \{a\}$ |
| 7.    For each v in ($V_r\setminus\{a,b\}$) |
| 8.      If ( ( Proj( r, $V_a\setminus\{v\}$ ) x Proj( r, $V_b$ ) ) = r ) |
| 9.      // Remove v from $V_a$ |
| 10.      $V_a$ := ( $V_a \setminus \{v\}$ ) |
| 11.      Else If ( ( Proj( r, $V_a$ ) x Proj( r, $V_b\setminus\{v\}$ ) ) = r ) |
| 12.      // Remove v from $V_b$ |
| 13.      $V_b$ := ( $V_b \setminus \{v\}$ ) |
| 14.    return { Proj(r, $V_a$) , Proj(r, $V_b$) } |
| 15. return Ø |

The input to the Rule Splitting Method is an R=BDD r. The method attempts to split the R-BDD r into two resulting R-BDDs such that the conjunction of the resulting R-BDDs is identical to the input R-BDD r (condition 1). Another condition (condition 2) of the splitting method is that each of the resulting R-BDDs depends on fewer variables than the input R-BDD r, i.e. if the input R-BDD r has k dependent variables, each of the resulting R-BDDs has at most (k−1) dependent variables.

At line 1 the variables in r are denoted as $V_r$. At line 2 any two random variables a and b included in $V_r$ are picked. The variables a and b are split-candidates, if the condition at line 3 is satisfied. In this case, the two R-BDDs Proj(r, $V_r\setminus\{b\}$) and Proj(r, $V_r\setminus\{a\}$) satisfy the two conditions mentioned above. At lines 5 and 6 the sets of variables $V_a$ and $V_b$ are defined. These are the sets of variables on which the resulting R-BDDs will depend on. In lines 7-13 it is attempted to remove further variables from any of the two resulting R-BDDs. At line 14 the resulting R-BDDs are returned.

Referring back to FIG. 1, the S-BDD 105 is generated subsequent to the generation of the R-BDDs 104. The S-BDD 105 is utilized to support a user during the subsequent scope setting 106. As already outlined above, the S=BDD 105 is a representation of the valid combinations among the values of the scope variables, i.e. the "small" configuration problem as we called it above.

Figures 15A, 15B:
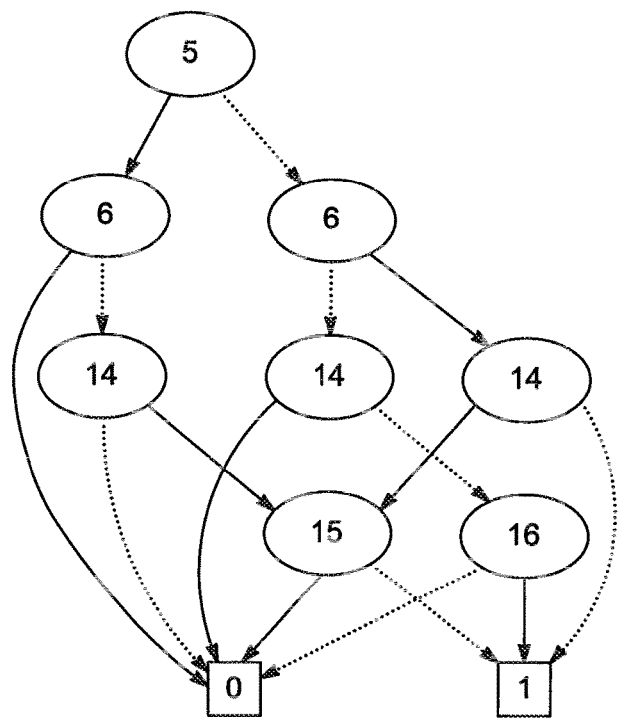
FIGS. 15 a) and b) represent the valid combinations among the scope variables Country, Engine, and GearBox of the exemplary car configuration initial product model in form of a table and an S-BDD, respectively.

Assuming that the variables Country, Engine, and GearBox of the exemplary car configuration product model of FIG. 2 are defined as scope variables. FIG. 15 a) depicts a screenshot of the valid combinations among these scope variables. The relation of FIG. 15 a) is a projection of the solution space of the initial car product model on the three scope variables, i.e. for any combination of scope variables displayed in FIG. 15 a) the configuration can be extended to a valid complete configuration fulfilling all rules included in the initial product model. FIG. 15 b) displays the S-BDD corresponding to the relation of FIG. 15 a). In the S-BDD, the combinations among the values of the variables Country (Boolean variables 5, 6) Engine (Boolean variables 14, 15) and GearBox (Boolean variables 16) are arranged in a way that the valid combinations among these variables correspond to a path starting at the root node (here 5) that ends at the 1-terminal node, while the path for all forbidden combinations ends at the 0-terminal node.

In general, the generation of an S-BDD 105 representing the valid combinations among values of scope variables can be a complex task. In some embodiments of the product configuration method of FIG. 1, the following method of generating an S-BDD 105 is employed:

A product model is represented by a pair (V, R), where V is the set of variables and R is the set of R-BDDs of the product model.

$V_S$ denotes the set of scope variables for which an S-BDD S needs to be generated.

$V_P$ denotes a set of auxiliary variables called "partition variables" with associated sets of values $a_1$-$a_j$.

Partition variables are target variables which are used to partition the solution space given by the initial product model in order to generate the S-BDD. Generally, the partition variables are formed by a subset of the scope variables defined in the product model, although it is also possible to include non-scope variables in the set of partition variables. In any case, similar to the scope variables, high-impact variables are selected as partition variables. As already indicated above, a variable is a high-impact variable, if selecting a value for the variable and simplifying the R-BBDs based on the selected value results in drastic restriction of the R-BDDs. Measures to quantify the impact of a particular variable could be the number of other variables having only a single valid value due to the selection of a value for the particular variable, or the magnitude of reduction in required BDD-nodes in the R-BDDs due to the selection of a value for the particular variable.

The set of partition variables $V_P$ could be specified upfront in the product-model or automatically determined as a small subset of one to five high-impact variables of V.

The following pseudo-code illustrates the applied method for determining an S-BDD:

| S-BDD ((V, R), $V_S$, $V_P$) |
| --- |
| 1. S := FALSE-BDD |
| 2. For each possible combination ($a_1$, $a_2$, ..., $a_j$) for $V_P$ |
| 3.    Restrict R with selected values ($a_1$, $a_2$, ..., $a_j$) resulting in R' |
| 4.    Build Tree-of-Bdds T for (V,R') |
| 5.    b := Project(T, $V_S$) |
| 6.    S := S + b |
| 7. return S |

The input to the S-BDD method is a product model (V, R) along with a set of scope variables $V_S$ and partition variables $V_P$. At line 1 the S-BDD S is initialized to represent the Boolean false value. Then, a for-loop reaching from line 2 to line 6 is executed for each possible combination of values for the variables in $V_P$ (The number of possible combinations of the values of the partition values can quickly grow with increasing size of $V_P$. Hence, only a limited number of variables in $V_P$, more specifically, a limited number of valid combinations of their values, is selected in order to perform the S-BDD calculation within a reasonable amount of time). At line 3 the selected values for $V_P$ are used to simplify the R-BDDs of R. The resulting simplified R-BDDs are denoted as R'. Subsequently, at line 4 a ToBDDs T for the resulting (V, R') is generated (see e.g. [ToBBDs2005]). At line 5, using the Project function for ToBDDs (see e.g. [ToBDDs2007]), a projection of the ToBDDs' Boolean function on the scope variables is generated in b. Subsequently, the BDD b is embedded in S-BDD S with a disjunction operation at line 6. At line 7, the S-BDD S is returned.

During the scope setting 106 values for the scope variables are selected out of the respective sets of values associated to the scope variables and set accordingly. The S-BDD 105 might be used to guide a user during this scope setting process.

This guidance takes the following form: After selecting a value for a first scope variable, a subset of values is suggested to a user prior to the selection of a value for any further scope variable. The suggested subset of values is generated based on the S-BDD 105 and represents the first restriction effected by the selection of the value of the first scope variable. It includes only those values of a scope variable which are compatible with the already selected scope variables.

As the S-BDD 105 is a projection of the solution space of the initial product model 102 on the scope variables 102a, the selections made based on the S-BDD 105 will automatically represent valid combinations of the complete configuration problem.

Based on the selected values for the scope variables 102a the initial product model 102 is simplified in the further process of the configuration method depicted in FIG. 1. In particular, the R-BDDs 104 are restricted in order to reflect the selected values of the scope variables 102a. This gives rise to a simplified product model 107, including the SRR-BDDs as a representation of the rules of the simplified product model 107 (cf. FIG. 17). As it is indicated in FIG. 1 with the help of different indices the number of SRR-BDDs ($C_1$-$C_n$) may differ from the number of R-BDDs ($B_1$-$B_m$).

The simplification of the initial product model 102 based on the scope setting 106 is now illustrated again with reference to the exemplary initial car model as shown in FIGS. 2 and 3. Assuming that the variable Country is the only scope variable defined in the initial product model of FIG. 2 no S-BDD is required to support scope setting (as this is only appropriate in the case of a plurality of scope variables, as explained above). In the course of restricting the rules of the initial product model, apart from restricting each rule individually based on the scope setting, a propagation method called unary constraint propagation may be used to support the simplification of the initial product model. In unary constraint propagation a constraint that is only defined over one variables (a so called "unary-constraint") is conjoined (logical AND) with any other rule depending on that variable. Afterwards, provided that the variable occurs in another rule, the unary constraint becomes redundant and is removed.

If the value US is selected for the scope variable Country, the initial product model of FIGS. 2 and 3 can be significantly simplified:

The rule EmissionEuro becomes obsolete.

The rule US_Petrol can be restricted to the unary-constraint Fuel=Petrol.

With Fuel=Petrol the rule CurrencyFuel can be restricted to Currency=USD.

With Fuel=Petrol, the rule FuelEngine can be restricted to Engine=2.0 TFSI.

With Engine=2.0 TFSI the rule GearBox becomes obsolete.

Based on the selection of US as value for Country three variables of the initial product model of FIG. 2, namely Currency, Engine, and Fuel have their values fixed automatically, namely Currency=USD, Engine=2.0 TFSI and Fuel=Petrol. These variables therefore are no longer selectable in the second stage of the configuration process. They have become constants and can therefore be removed as selectable variables from the product model. Only the remaining variables Date, EmissionStandard and GearBox are still included in the simplified product model 107.

Furthermore, the rules EmissionEuro, US_Petrol, CurrencyFuel, FuelEngine, and GearBox are not part of the simplified product model 107 anymore, as they either became obsolete (as variables values they associated were fixed and the variables were removed from the product model) or were restricted to unary-constraints, as indicated above. The only rule left in the simplified product model 107 is the EmissionUS rule. However, also this rule is simplified due to the scope setting. FIG. 16 displays a screenshot of the simplified EmissionUS rule, in which the Country is fixed to US.

Figure 17:
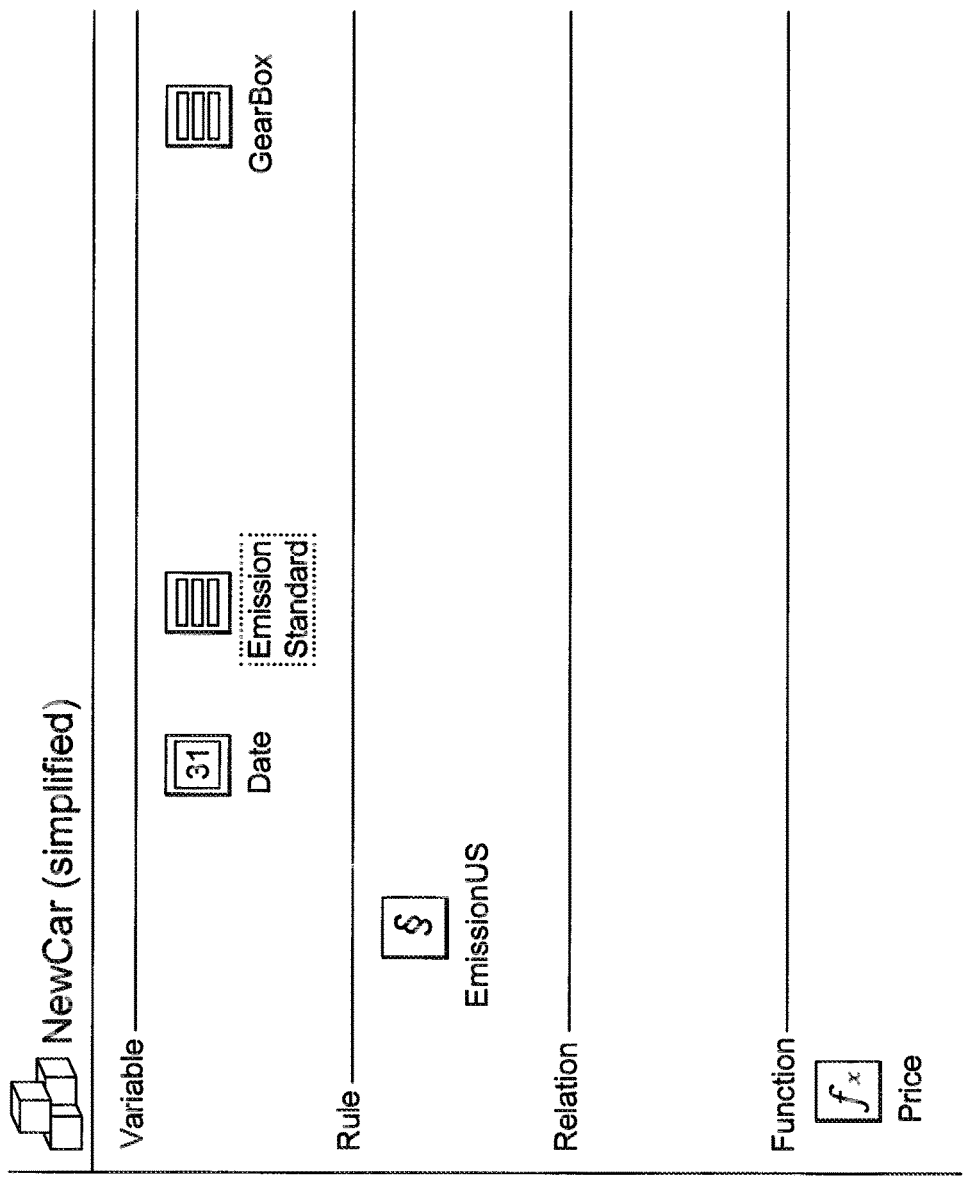
FIG. 17 displays the simplified product model resulting from a scope setting restriction of the initial car configuration initial product model of FIGS. 2 and 3.

The simplified product model 107 of the exemplary car configuration problem is illustrated in FIG. 17. It should be noted that the selected values of the variables of the initial car configuration product model of FIG. 2 might still be included in the simplified product model of FIG. 17; however, these constants do not form part of the simplified configuration problem anymore.

Note that restricting the initial product model 102 to the simplified product model 107 also impacts the (optional) time domain subdivision for time-related variables which is derived from the rules defining dependencies for such time-related variables as explained above with reference to FIG. 6. A time domain subdivision performed in the initial product model is propagated on the basis of the restricted rules and generally reduced set of variables and values. Thus, in the simplified product model, time domain subdivision for time-related variables generally differs from that of the initial product model.

Complex product models, as e.g. the further above mentioned car development configuration problem, often include thousands or even hundreds of thousands of rules and variables. For such complex configuration problems the simplification of the product model based on a scope setting typically reduces the number of rules by an order of magnitude.

In principle, there is no upper limit of the number of variables and rules that can be handled with the claimed method of product configuration. Technologically, the limiting factor is the resources of the computer performing the method of product configuration. However, with progressing increase of computer power configuration problems with several millions of rules and variables could be handled already in near future.

Referring back to FIG. 1, on the basis of the simplified product model 107 a ToBDDs 108 is generated. The concept of connected components is employed to generate a ToBDDs 108. According to this concept, a first rule is regarded to be connected to a second rule, (a) if both of the rules share a variable, or (b) if there is a third rule which is connected to the first/second rules, and this third rule shares a variable with the second/first rule; the connected rules and the variables associated to the connected rules form a connected component. The ToBDDs includes a tree for each set of connected components included in the simplified product model. Each tree is generated based on a tree decomposition, in which the respective rules of the simplified product model 107 are arranged at the tree-nodes of the tree decomposition based on pre-defined tree-decomposition properties. The entirety of rules, represented by corresponding SR-BDDs, attached to each single node is then merged, resulting in a single BDD at each node of the tree-decomposition. The resulting structure of all trees with attached BDDs at the nodes of the tree decomposition is called Tree of BDDs (ToBDDs). The ToBDDs 108 can be regarded as a representation of the valid solutions of the configuration problem defined by the simplified product model 107.

Figure 18:
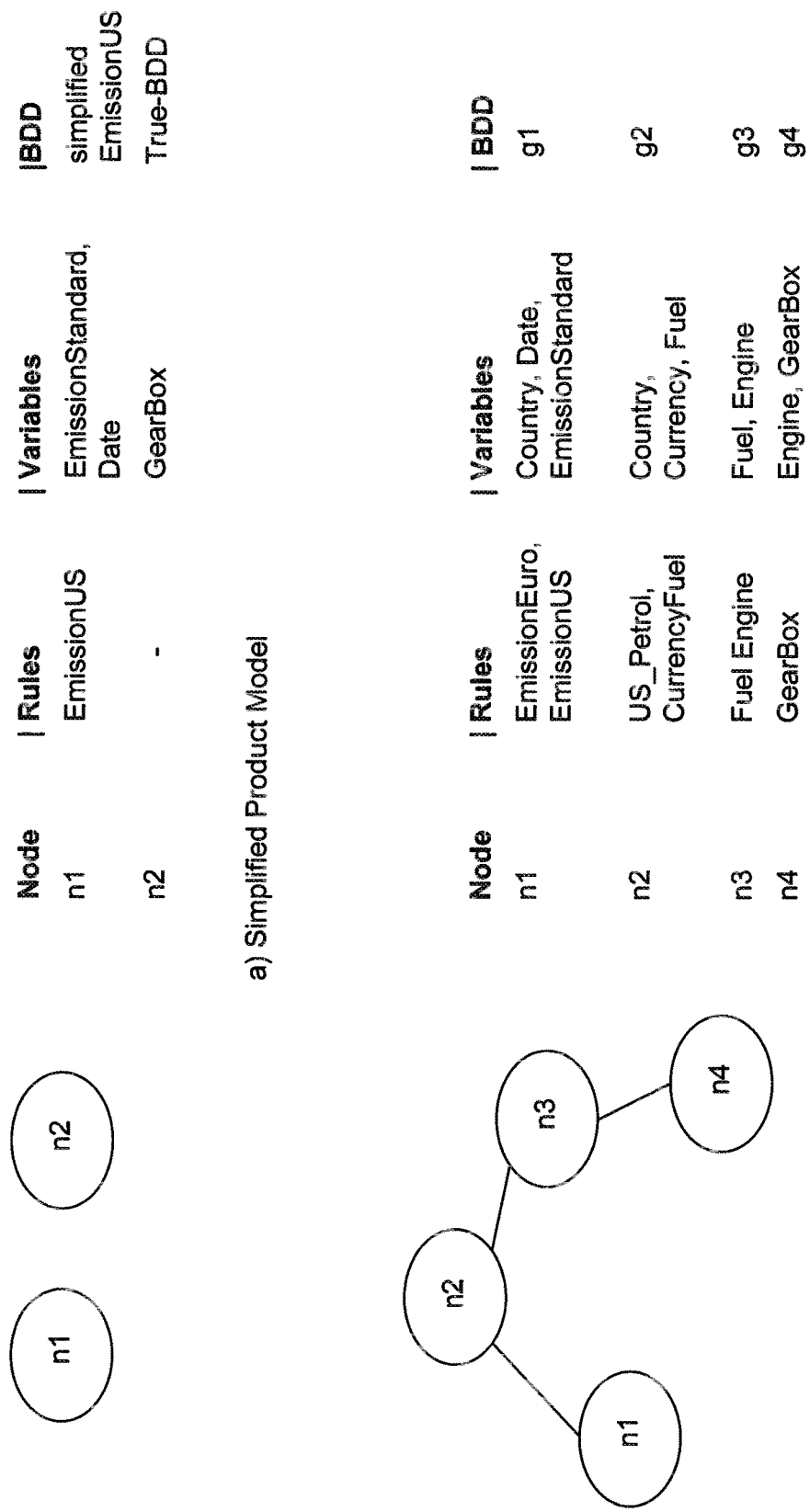
FIG. 18 shows the ToBDDs of the simplified product model of FIG. 17.

In the case of the simplified car configuration product model of FIG. 17 (resulting from a scope restriction with Country as the only scope variable in the initial product model set to US), only one rule and three variables are included in the product model. As the variable GearBox does not appear in the simplified EmissionUS rule, it is neither connected to the simplified EmissionUS rule nor to the other variables of the simplified product model and therefore forms a connected component on its own. The remaining two variables Date and EmissionStandard are included in the simplified EmissionUS rule; these three components form a further set of connected components. Consequently, the ToBDDs of the simplified car configuration product model includes two "trees" based on the two sets of connected components, as can be seen in FIG. 18 *a*). The first tree representing the EmissionUS rule and the variables EmissionStandard and Date includes only one node (n1), as only one rule is represented by this tree. The BDD attached to the n1 node is identical to the R-BDD of the simplified EmissionUS rule of FIG. 16. The second tree with its only n2-node represents the GearBox variable. As the GearBox variable is independent of any rule, the BDD attached to the n2 node is a so called "True-BDD" indicating that each of the values of the GearBox variable is valid.

To illustrate the degree of simplification achieved by the scope setting (Country=US) FIG. 18 *b*) shows the hypothetical ToBDDs corresponding to the initial car configuration product model of FIG. 2, as it would have been generated without any simplification resulting from a scope setting. As all rules of the initial product model are connected to each other, and each variable of the initial product model is associated to at least one rule (as can be seen in the table of FIG. 18 *b*)), only one connected component exists for the initial product model. Consequently, the ToBDD of this configuration problem includes only one tree. The tree itself includes four nodes, n1 to n4. The rules and variables of the initial product model which are associated to each node in the form of a BDD (g1 to g4, respectively) are displayed in the table of FIG. 18 *b*). If more than one rule is attached to a certain node, the R-BDDs of the rules are merged to generate the respective BDD of a node (in the case of g1 and g2), otherwise, the BDD associated to a node is identical to the R-BDD of the respective rule (in the case of g3 and g4).

By comparing both ToBDDs depicted in 18 *a*) (representing the simplified product model) and 18 *b*) (representing the initial product model), the simplification achieved by the scope setting becomes obvious. Both, the width of the ToBDDs and the complexity of the BDDs attached to the nodes of the ToBDDs, are reduced by the scope setting, enabling a more efficient execution of the configuration problem in the second stage of the product configuration.

Subsequently, in the course of the second stage of the configuration, the values for the non-scope variables are selected (manually by the user or automatically by the computer) in order to complete the product configuration. The computer sets the values of the non-scope variables according to the selection. The selection and setting of the non-scope variables is an iterative process. It terminates, at the latest if values for all non-scope variables are selected and set. The ToBDDs 108 may be consulted to assure that the selection of the non-scope variables results in a valid configuration.

In the example of FIG. 1, the process of selecting and setting values for the non-scope variables includes forming a partial configuration 109. On the basis of this partial configuration 109 several activities 110 might be performed by the computer. These activities might include a variety of queries (see above), which may be answered under consideration of the ToBDDs 108.

In the exemplary product model of FIG. 2, the mathematical function Price is defined in the product model. On the basis of a partial configuration including the variable Fuel this function, which is displayed as source-code implementation in FIG. 19, might be used to calculate the price of a configured car.

Figure 19:
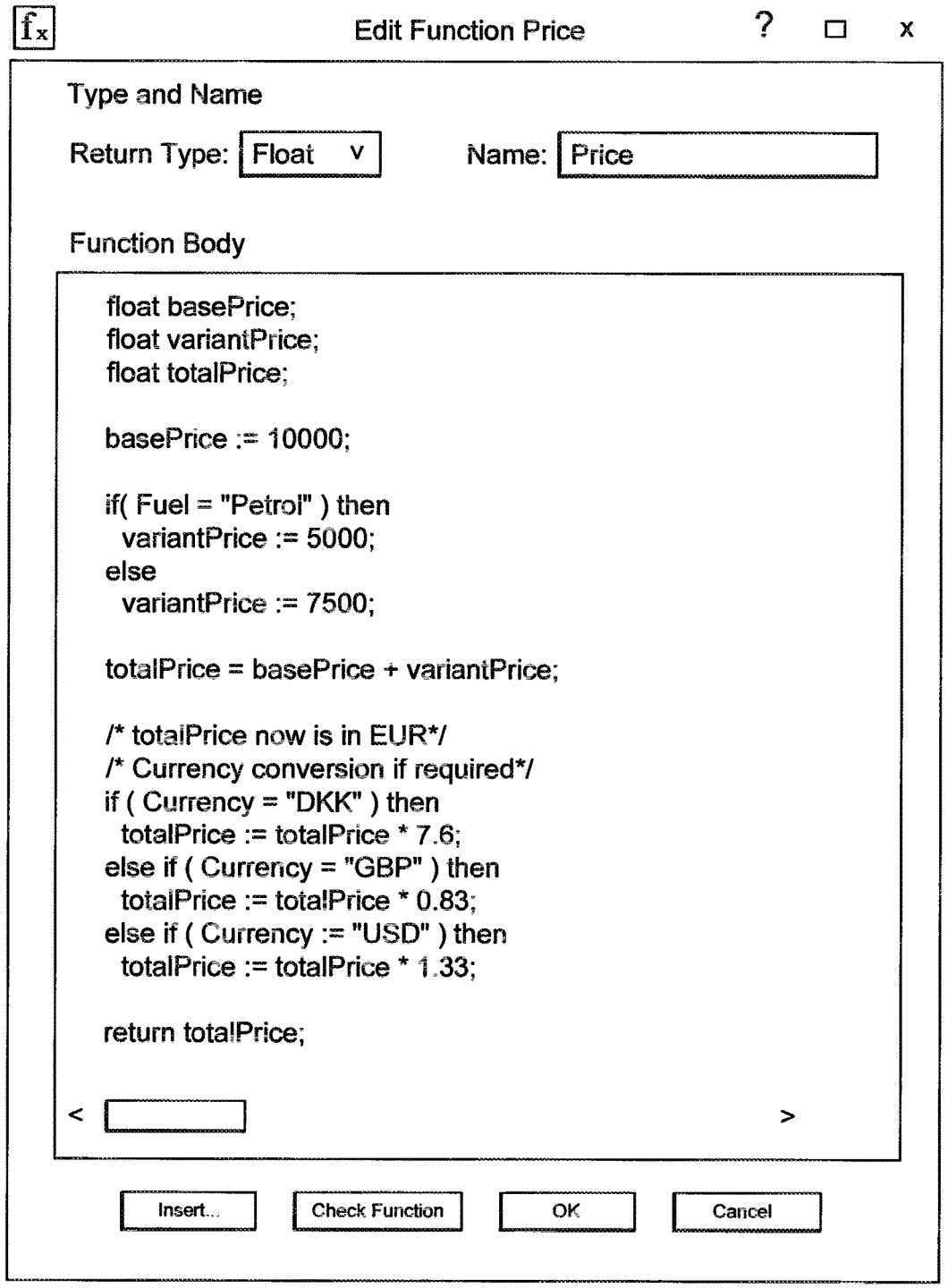
FIG. 19 depicts the mathematical function Price included in the exemplary car configuration initial product model.

As can be seen in the example of FIG. 19 a car has a base price of 10000 EUR. Depending on the type of fuel, additional costs emerge (for Petrol: 5000 Euro, for Diesel: 7500 Euro). The base price and the additional costs (variant price) add up to the total price of the car. This total price is finally displayed to a user, if respective query is performed. If a different value for the variable Currency such as DKK, GBP, or USD was selected during the car configuration process, the total price of the car is converted to the selected Currency based on a predefined currency conversion factor before it is displayed to the user.

In the embodiment of the method of configuring a product depicted in FIG. 1 the segments from 101 to 105 are performed offline, e.g. by one or more servers which are generally not accessed by end user configuration requests. User input is not necessary in this first phase of the configuration. The offline phase is generally performed only once per product model and might be repeated in the case of a product model adaptation. Due to the absence of user interaction, time constraints for the offline calculations are more relaxed.

Subsequently, the segments 106 to 110, including the selection of all variables and the restriction of the initial product model 102 to the simplified product model 107, are performed on an online accessible configuration server, as indicated in FIG. 1. In the case, this online accessible configuration server differs from the server(s) performing the offline calculation, the product model representations, e.g. the RE-BDDs and the S-BDD, are transferred from the offline to the online server. Segment 106 is generally the starting point of the interactive selection of the scope and non-scope variables supervised by the user. This interactive selection is generally performed multiple times on the basis of the same product model representation established by the segments 101 to 105.

The method terminates at segment 111, either by having achieved a complete configuration or premature abort, e.g. by manual termination command issued by the user.

Figure 20:
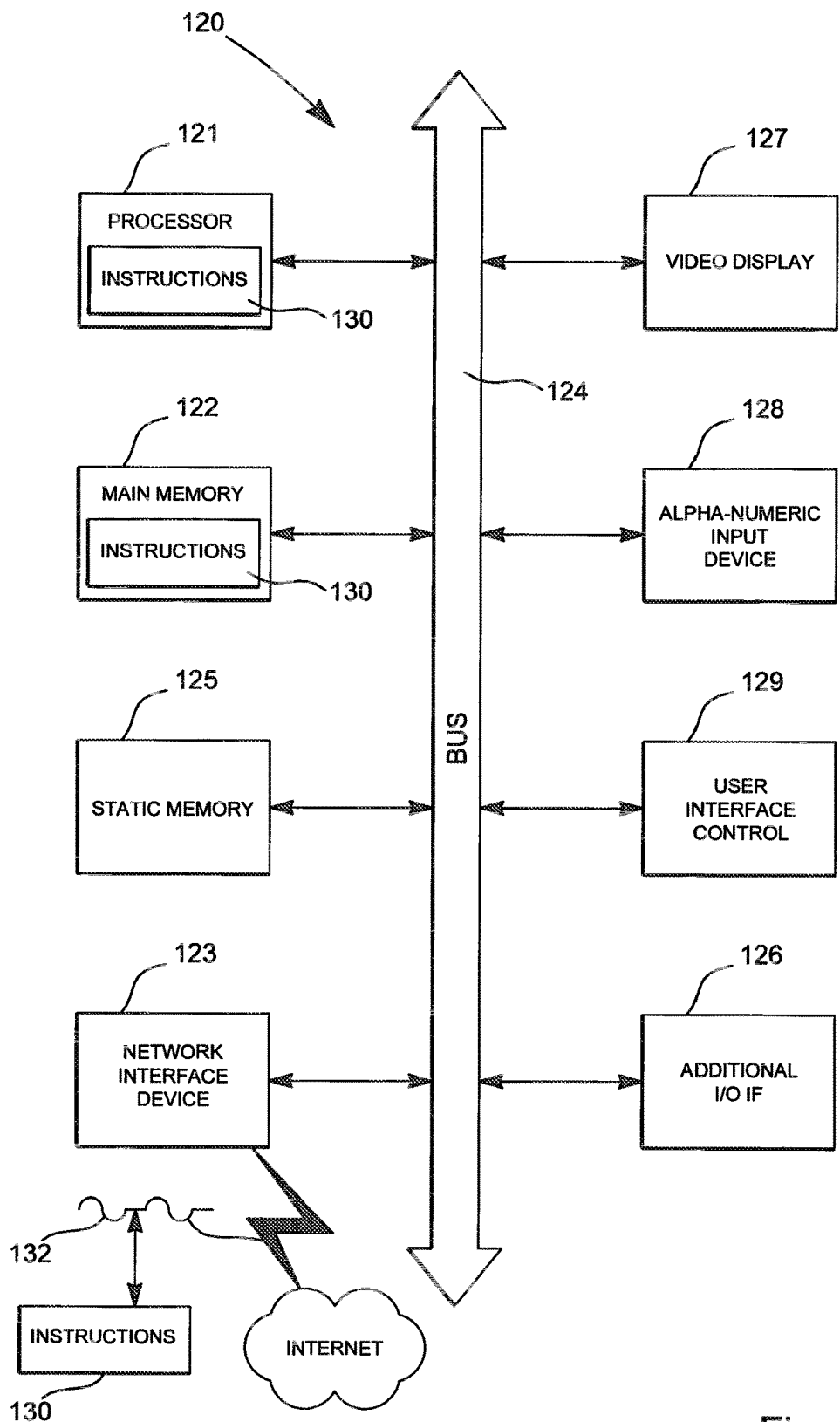
FIG. 20 is an exemplary schematic view of the internal architecture of a computer/server implementing a configuration as described herein.

Finally, FIG. 20 is a diagrammatic representation of the internal structure of a computer or server 120 which implements the product configuration mechanisms described herein. The computer or server 120 is arranged to execute a set of instructions, to cause it to perform any of the methodologies explained above. The computer or server 120 includes a processor 121, a main memory 122 and, optionally, a wireless network interface 123 (such as a Wi-Fi and/or Bluetooth interface) and/or a 2G/3G/4G mobile network interface device, all of which communicate with each other via a bus 124. It further includes a static memory 125, e.g. non-removable flash and/or solid state drive and/or a removable Micro or Mini SD card, which permanently stores the software enabling computer/server 120 to execute its functions, such as storing a product model including pre-determined scope variables, generating Rule BDDs, allowing the selection of values for the scope variables, restricting the product model e.g. to a Tree-of-BDDs and allowing a user to iteratively select values for non-scope variables in order to finish configuration, etc. and to optionally communicate with client computers/devices within a local or wide area network via its wired and/or wireless network interface device 123. Furthermore, computer/server 120 includes a display 127, a user interface control module 129 and an alpha-numeric and cursor input device 128. Optionally, additional I/O interfaces 126 such as card reader and USB interfaces may be present. An executable set of instructions (i.e. software) 130 embodying any one, or all, of the methodologies described above, resides completely, or at least partially, permanently in the non-volatile memory 125. When being executed, respective process data resides in the main memory 122 and/or the processor 121. The software 130 may further be transmitted or received as a propagated signal 132 through the wired or wireless network interface device 123 from/to a software server within the local area network or the Internet.

Although certain products and methods constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A computer-implemented method for assembling a product using a valid product configuration, the method comprising:
   generating, by a computer processing system, an initial product model for the product, wherein the initial product model is generated using at least variables and rules, and wherein the variables and rules further comprise:
      variables, wherein each variable is associated with a set of values, and wherein at least one of the variables is defined as a scope variable, and
      rules representing inter-dependencies among the variables and values, wherein the variables and rules define a product configuration problem to be solved;
   restricting, by the computer processing system, the initial product model, further comprising:
      splitting at least one rule of the initial product model into a plurality of rules, the plurality of rules replacing the at least one rule, wherein each of the plurality of rules depends on fewer variables than the at least one rule,
      setting one value from the set of values of at least one scope variable, wherein the at least one scope variable is a variable that restricts one or more variables, one or more rules, or a combination thereof of the initial product model, and wherein setting the value of the at least one scope variable results in a simplification of the initial product model, and
      deleting rules of the initial product model which become redundant by setting the value of the at least one scope variable;
   generating, by the computer processing system, a simplified product model based on the restricted initial product model;
   iteratively setting values for other variables not being scope variables based on the simplified product model to generate a valid product configuration; and
   configuring, by the computer processing system, the product during manufacture of the product based on the valid product configuration; and
   assembling the product configured using the valid product configuration.

2. The method of claim 1, further comprising:
   generating Rule Binary Decision Diagrams, R-BDDs, representing the rules of the initial product model,
   restricting the R-BDDs based on the set value from the set of values of the at least one scope variable resulting in Scope Restricted Rule Binary Decision Diagrams, SRR-BDDs, representing the rules of the simplified product model.

3. The method of claim 1, further comprising generating a Tree of Binary Decision Diagrams, ToBDDs, representing the simplified product model, wherein the iterative setting of values for other variables not being scope variables is based on the ToBDDs.

4. The method of claim 1, further comprising:
   generating R-BDDs representing the rules of the initial product model,
   restricting the R-BDDs based on a selected value from the set of values of the at least one scope variable resulting in SRR-BDDs representing the rules of the simplified product model,
   generating a ToBDDs representing the simplified product model, wherein the iterative setting of values for other variables not being scope variables is based on the ToBDDs.

5. The method of claim 1, wherein at least two variables are defined as scope variables, the method further comprising:
   generating a Scope Binary Decision Diagram, S-BDD, representing those combinations among the values of the at least two scope variables for which the product configuration problem to be solved has at least one valid solution,
   after a value for a first of at least two scope values is set, determining—by utilizing the S-BDD—valid values for a second of the at least two scope variables,
   setting a value for the second of the at least two scope variables from the valid values.

6. The method of claim 1, wherein at least two variables are defined as scope variables, the method further comprising:
   generating R-BDDs representing the rules of the initial product model,
   generating a S-BDD representing those combinations among the values of the at least two variables defined as scope variables for which the product configuration problem to be solved has at least one valid solution,
   after a value for a first of the at least two variables defined as scope variables is set, determining—by utilizing the S-BDD—valid values for a second of the at least two variables defined as scope variables, setting a value for the second of the at least two variables defined as scope variables from the valid values, restricting the R-BDDs based on the set value from the set of values of the at least one scope variable resulting in SRR-BDDs representing the rules of the simplified product model.

7. The method of claim 1, wherein at least two variables are defined as scope variables, the method further comprising:

generating a S-BDD representing those combinations among the values of the at least two variables defined as scope variables for which the product configuration problem to be solved has at least one valid solution, after a value for a first of the at least two variables defined as scope variables is set, determining—by utilizing the S-BDD—valid values for a second of the at least two variables defined as scope variables, setting a value for the second of the at least two variables defined as scope variables from the valid values, generating a ToBDDs representing the simplified product model, wherein the iterative setting of values for other variables not being scope variables is based on the ToBDDs.

8. The method of claim 1, wherein at least two variables are defined as scope variables, the method further comprising:

generating R-BDDs representing the rules of the initial product model, generating a S-BDD representing those combinations among the values of the at least two variables defined as scope variables for which the product configuration problem to be solved has at least one valid solution, after a value for a first of the at least two variables defined as scope variables is set, determining—by utilizing the S-BDD—valid values for a second of the at least two variables defined as scope variables, setting a value for the second of the at least two variables defined as scope variables from the valid values, restricting the R-BDDs based on the set value from the set of values of the at least one scope variable resulting in SRR-BDDs representing the rules of the simplified product model, generating a ToBDDs representing the simplified product model, wherein the iterative setting of values for other variables not being scope variables is based on the ToBDDs.

9. The method of claim 1, wherein the iterative setting of values for other variables not being scope variables comprises setting a value for at least one variable, the at least one variable with the set value forming a partial configuration, performing at least one of the following activities based on the partial configuration:

verifying whether the partial configuration is consistent with the rules of the simplified product model, attempting an automatic solution of the product configuration problem to be solved, determining consistent values for remaining variables not being scope variables and not being already set variables, determining inconsistencies caused by the setting of the value for the at least one variable, determining a number of possible consistent solutions to the product configuration problem to be solved, and calculating a result based on a mathematical function included in the simplified product model.

10. The method of claim 1, wherein the setting of values and the restriction of the initial product model to the simplified product model are performed on an online accessible configuration server.

11. A s stem for assembling a product using a valid product configuration, comprising:

a processor; and a memory coupled to the processor for storing instructions, which when executed from the memory, cause the processor to perform operations for a product configuration during assembly of the product the operations including:

generating an initial product model for the product, wherein the initial product model is generated using at least variables and rules, and wherein the variables and rules further comprise:

variables, wherein each variable is associated with a set of values, and wherein at least one of the variables is defined as a scope variable, and rules representing inter-dependencies among the variables and values, wherein the variables and rules define a product configuration problem to be solved, restricting the initial product model, further comprising splitting at least one rule of the initial product model into a plurality of rules, the plurality of rules replacing the at least one rule, wherein each of the plurality of rules depends on fewer variables than the at least one rule, setting one value from the set of values of at least one scope variable, wherein the at least one scope variable is a variable that restricts one or more variables, one or more rules, or a combination thereof of the initial product model, and wherein setting the value of the at least one scope variable results in a simplification of the initial product model, and deleting rules of the initial product model which become redundant by setting the value of the at least one scope variable, generating a simplified product model based on the restricted initial product model, iteratively setting values for other variables not being scope variables based on the simplified product model to generate a valid product configuration, configuring the product during manufacture of the product based on the valid product configuration, and assembling the product configured using the valid product configuration.

12. The system of claim 11, further being configured to generate R-BDDs representing the rules of the initial product model, restrict the R-BDDS based on a selected value from the set of values of the at least one scope variable resulting in SRR-BDDs representing the rules of the simplified product model.

13. The system of claim 11, further being configured to generate a ToBDDs representing the simplified product model, wherein the iterative setting of values for other variables not being scope variables is based on the ToBDDs.

14. The system of claim 11, further being configured to generate R-BDDs representing the rules of the initial product model, restrict the R-BDDS based on a selected value from the set of values of the at least one scope variable resulting in SRR-BDDs representing the rules of the simplified product model, generate a ToBDDS representing the simplified product model, wherein the iterative setting of values for other variables not being scope variables is based on the ToBDDs.

15. The system of claim 11, wherein at least two variables are defined as scope variables, the system further being configured to generate a S-BDD representing those combinations among the values of the at least two variables defined as scope variables for which the product configuration problem to be solved as at least one valid solution, after a value for a first of at least two variables defined as scope variables is set, determine—by utilizing the S-BDD—valid values for a second of the at least two variables defined as scope variables, set a value for the second of the at least two variables defined as scope variables from the valid values.

16. The system of claim 11, further being configured to execute the iterative setting of values for other variables not being scope variables by setting a value for at least one variable, the at least one variable with the set value forming a partial configuration, and performing at least one of the following activities based on the partial configuration:

verifying whether the partial configuration is consistent with the rules of the simplified product model, attempting an automatic solution of the product configuration problem to be solved, determining consistent values for remaining variables not being scope variables and not being already set variables, determining inconsistencies caused by the setting of the value for the at least one variable, determining a number of possible consistent solutions to the product configuration problem to be solved, and calculating a result based on a mathematical function included in the simplified product model.

17. A non-transitory computer readable storage medium having computer program instructions stored therein, which when executed by a processor on a system cause the processor of the system to perform operations for assembling a product based on a valid product configuration, the operations comprising:

generating an initial product model for the product, wherein the initial product model is generated using at least variables and rules, and wherein the variables and rules further comprise:

variables, wherein each variable is associated with a set of values, and wherein at least one of the variables is defined as a scope variable, and rules representing inter-dependencies among the variables and values, wherein the variables and rules define a product configuration problem to be solved;

restricting the initial product model, further comprising splitting at least one rule of the initial product model into a plurality of rules, the plurality of rules replacing the at least one rule, wherein each of the plurality of rules depends on fewer variables than the at least one rule, setting one value from the set of values of at least one scope variable, wherein the at least one scope variable is a variable that restricts one or more variables, one or more rules, or a combination thereof of the initial product model, and wherein setting the value of the at least one scope variable results in a simplification of the initial product model, and deleting rules of the initial product model which become redundant by setting the value of the at least one scope variable;

generating a simplified product model based on the restricted initial product model;

iteratively setting values for other variables not being scope variables based on the simplified product model to generate a valid product configuration; and configuring the product dud ng manufacture of the duct based on the valid product configuration; and assembling the product configured using the valid product configuration.

* * * * *